(12) United States Patent
Ahn et al.

(10) Patent No.: US 7,873,005 B2
(45) Date of Patent: Jan. 18, 2011

(54) METHOD FOR RESOLVING COLLISION OF UPLINK SIGNALS

(75) Inventors: Joon Kui Ahn, Anyang-Si (KR); Young Woo Yun, Anyang-Si (KR); Ki Jun Kim, Anyang-Si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 12/396,959

(22) Filed: Mar. 3, 2009

(65) Prior Publication Data

US 2009/0232095 A1 Sep. 17, 2009

Related U.S. Application Data

(60) Provisional application No. 61/033,403, filed on Mar. 3, 2008, provisional application No. 61/036,984, filed on Mar. 16, 2008.

(30) Foreign Application Priority Data

Feb. 5, 2009 (KR) ...................... 10-2009-0009245

(51) Int. Cl.
*H04W 4/00* (2009.01)
*H04J 1/00* (2006.01)
*H04B 7/208* (2006.01)

(52) U.S. Cl. ...................... 370/329; 370/328; 370/341; 370/343; 370/344

(58) Field of Classification Search ................. 370/280, 370/294–295, 314, 336–338, 341, 410, 414–418, 370/420, 426, 430, 902, 913, 319–322, 331–332, 370/328–334, 343–345, 347–350; 455/69, 455/418, 420, 434, 450–451, 452.1–452.2, 455/453, 464, 509, 550.1, 556.2, 561
See application file for complete search history.

(56) References Cited

U.S. PATENT DOCUMENTS 5,966,378 A * 10/1999 Hamalainen ................. 370/348
6,868,520 B1 * 3/2005 Fauconnier ................. 714/790

(Continued)

FOREIGN PATENT DOCUMENTS

KR  10-2005-0116076 A  12/2005

(Continued)

*Primary Examiner*—Meless N Zewdu
(74) *Attorney, Agent, or Firm*—Birch, Stewart, Kolasch & Birch, LLP

(57) ABSTRACT

A method for processing data in a wireless communication system is provided. The method includes receiving a first uplink scheduling command indicating a first radio resource, receiving a second uplink scheduling command indicating a second radio resource through a random access response, and stopping a procedure associated with the second uplink scheduling command when the first radio resource and the second radio resource collide.

10 Claims, 20 Drawing Sheets

* It may indicate a resource colliding with the RA-PUSCH transmission

U.S. PATENT DOCUMENTS

| | | |
|---|---|---|
| 6,967,936 B1 | 11/2005 | Laroia et al. |
| 7,385,952 B2 | 6/2008 | Mantha et al. |
| 2001/0055293 A1* | 12/2001 | Parsa et al. ................. 370/342 |
| 2007/0291696 A1* | 12/2007 | Zhang et al. ................. 370/331 |
| 2007/0293218 A1* | 12/2007 | Meylan et al. ............... 455/434 |
| 2008/0005639 A1* | 1/2008 | Frederiksen ................. 714/751 |
| 2008/0080423 A1* | 4/2008 | Kolding et al. .............. 370/329 |
| 2008/0139214 A1 | 6/2008 | Sun et al. |
| 2008/0192766 A1* | 8/2008 | Ranta-Aho et al. .......... 370/445 |
| 2008/0273610 A1* | 11/2008 | Malladi et al. ............... 375/260 |
| 2008/0311919 A1* | 12/2008 | Whinnett et al. ............ 455/447 |
| 2009/0016266 A1 | 1/2009 | Kim et al. |
| 2009/0041240 A1* | 2/2009 | Parkvall et al. ............. 380/247 |
| 2009/0080366 A1* | 3/2009 | Shao et al. .................. 370/315 |
| 2009/0156194 A1 | 6/2009 | Meylan |
| 2009/0181687 A1* | 7/2009 | Tiirola et al. ................ 455/450 |
| 2009/0186613 A1* | 7/2009 | Ahn et al. .................... 455/434 |
| 2009/0213968 A1 | 8/2009 | Tormalehto |

FOREIGN PATENT DOCUMENTS

| | | |
|---|---|---|
| KR | 10-2007-0023484 A | 2/2007 |
| KR | 10-2007-0024427 A | 3/2007 |
| KR | 10-2008-0032258 A | 4/2008 |
| KR | 10-2008-0112119 A | 12/2008 |

* cited by examiner

* S1 interface includes S1-U and S1-MME interfaces
* X2 interface includes X2-U and X2-CP interfaces

FIG. 2
Related Art
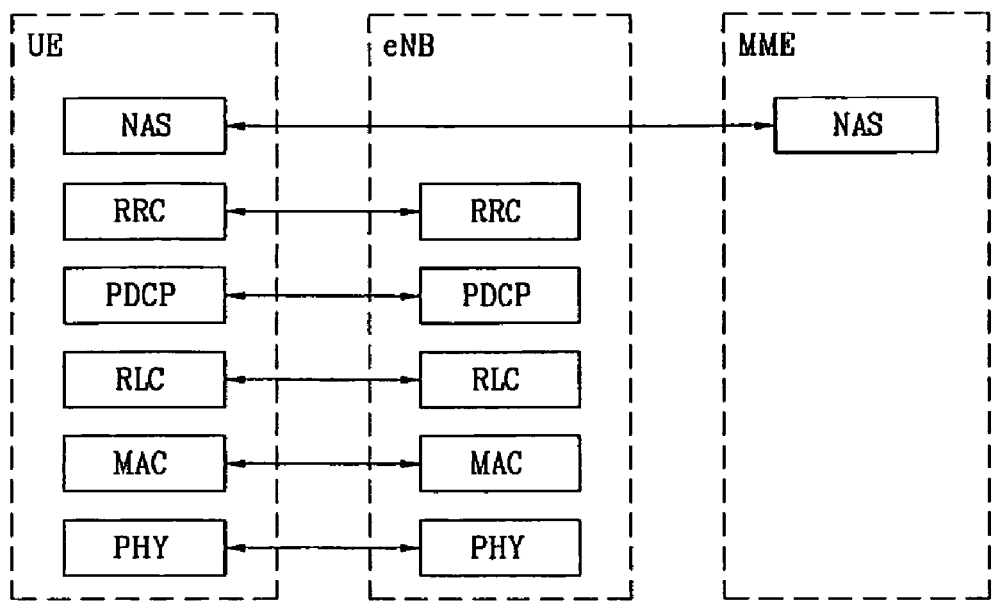
(a) Control-plane protocol stack
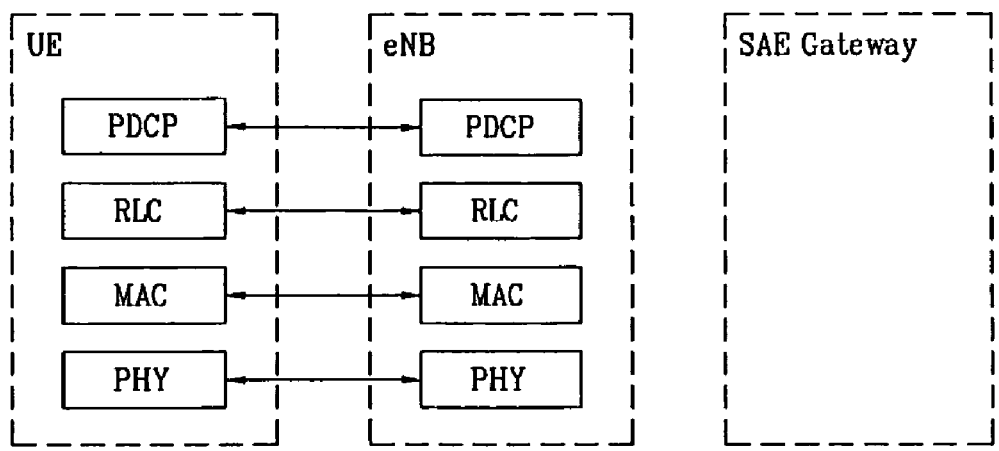
(b) User-plane protocol stack

* It may require a UL transmission, preferably, using a resource colliding with RA-PUSCH transmission

* It may require a UL transmission, preferably, using a resource colliding with RA-PUSCH transmission

METHOD FOR RESOLVING COLLISION OF UPLINK SIGNALS

This application claims the benefit of U.S. provisional application 61/033,403, filed on Mar. 3, 2008, U.S. provisional application 61/036,984, filed on Mar. 16, 2008, and Korean Patent Application No. 10-2009-0009245, filed on Feb. 5, 2009, which are hereby incorporated by reference as if fully set forth herein.

BACKGROUND OF THE INVENTION

1. Field of the Invention

The present invention relates to a wireless communication system that supports at least one of SC-FDMA, MC-FDMA, and OFDMA, and more particularly, to a method for resolving collision of signals transmitted in uplink in the wireless communication system.

2. Discussion of the Related Art

An E-UMTS system is an evolved version of the WCDMA UMTS system and basic standardization thereof is in progress under the 3rd Generation Partnership Project (3GPP). The E-UMTS is also referred to as a Long Term Evolution (LTE) system. For details of the technical specifications of the UMTS and E-UMTS, refer to Release 7 and Release 8 of "3rd Generation Partnership Project; Technical Specification Group Radio Access Network".

The E-UMTS mainly includes a User Equipment (UE), base stations (or eNBs or eNode Bs), and an Access Gateway (AG) which is located at an end of a network (E-UTRAN) and which is connected to an external network. Generally, an eNB can simultaneously transmit multiple data streams for a broadcast service, a multicast service and/or a unicast service. The AG can be divided into a part that handles processing of user traffic and a part that handles control traffic. Here, the AG part for processing new user traffic and the AG part for processing control traffic can communicate with each other using a new interface. One or more cells may be present for one eNB. An interface for transmitting user traffic or control traffic can be used between eNBs. A Core Network (CN) may include the AG and a network node or the like for user registration of UEs. An interface for discriminating between the E-UTRAN and the CN can be used. The AG manages mobility of a UE on a Tracking Area (TA) basis. One TA includes a plurality of cells. When the UE has moved from a specific TA to another TA, the UE notifies the AG that the TA where the UE is located has been changed.

FIG. 1 illustrates a network structure of an Evolved Universal Terrestrial Radio Access Network (E-UTRAN) system. The E-UTRAN system is an evolved version of the conventional UTRAN system. The E-UTRAN includes base stations that will also be referred to as "eNode Bs" or "eNBs". The eNBs are connected through X2 interfaces. The X2 user plane interface (X2-U) is defined between eNBs. The X2-U interface provides non guaranteed delivery of user plane PDUs. The X2 control plane interface (X2-CP) is defined between two neighbour eNBs. The X2-CP performs following functions: context transfer between eNBs, control of user plane tunnels between source eNB and target eNB, transfer of handover related messages, uplink load management and the like. Each eNB is connected to User Equipments (UEs) through a radio interface and is connected to an Evolved Packet Core (EPC) through an S1 interface. The S1 user plane interface (S1-U) is defined between the eNB and the S-GW. The S1-U interface provides non guaranteed delivery of user plane PDUs between the eNB and the S-GW (Serving Gateway). The S1 control plane interface (S1-MME) is defined between the eNB and the MME (Mobility Management Entity). The S1 interface performs following functions: EPS (Enhanced Packet System) Bearer Service Management function, NAS (Non-Access Stratum) Signalling Transport function, Network Sharing Function, MME Load balancing Function and the like.

FIG. 2 illustrates the configurations of a control plane and a user plane of a radio interface protocol between the E-UTRAN and a UE based on the 3GPP radio access network standard. The radio interface protocol is divided horizontally into a physical layer, a data link layer, and a network layer, and vertically into a user plane for data transmission and a control plane for signaling. The protocol layers of FIG. 2 can be divided into an L1 layer (first layer), an L2 layer (second layer), and an L3 layer (third layer) based on the lower three layers of the Open System Interconnection (OSI) reference model widely known in communication systems.

The control plane is a passage through which control messages that a UE and a network use in order to manage calls are transmitted. The user plane is a passage through which data (e.g., voice data or Internet packet data) generated at an application layer is transmitted. The following is a detailed description of the layers of the control and user planes in a radio interface protocol.

The physical layer, which is the first layer, provides an information transfer service to an upper layer using a physical channel. The physical layer is connected to a Media Access Control (MAC) layer, located above the physical layer, through a transport channel. Data is transferred between the MAC layer and the physical layer through the transport channel. Data transfer between different physical layers, specifically between the respective physical layers of transmitting and receiving sides, is performed through the physical channel. The physical channel is modulated according to the Orthogonal Frequency Division Multiplexing (OFDM) method, using time and frequencies as radio resources.

The MAC layer of the second layer provides a service to a Radio Link Control (RLC) layer, located above the MAC layer, through a logical channel. The RLC layer of the second layer supports reliable data transmission. The functions of the RLC layer may also be implemented through internal functional blocks of the MAC layer. In this case, the RLC layer need not be present. A PDCP layer of the second layer performs a header compression function to reduce unnecessary control information in order to efficiently transmit IP packets such as IPv4 or IPv6 packets in a radio interface with a relatively narrow bandwidth.

A Radio Resource Control (RRC) layer located at the bottom of the third layer is defined only in the control plane and is responsible for control of logical, transport, and physical channels in association with configuration, re-configuration, and release of Radio Bearers (RBs). The RB is a service that the second layer provides for data communication between the UE and the E-UTRAN. To accomplish this, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode.

A Non-Access Stratum (NAS) layer located above the RRC layer performs functions such as session management and mobility management.

One cell of the eNB is set to use a bandwidth such as 1.25, 2.5, 5, 10 or 20 MHz to provide a downlink or uplink transmission service to UEs. Here, different cells may be set to use different bandwidths.

Downlink transport channels for transmission of data from the network to the UE include a Broadcast Channel (BCH) for transmission of system information, a Paging Channel (PCH) for transmission of paging messages, and a downlink Shared Channel (SCH) for transmission of user traffic or control messages. User traffic or control messages of a downlink multicast or broadcast service may be transmitted through a downlink SCH and may also be transmitted through a downlink multicast channel (MCH). Uplink transport channels for transmission of data from the UE to the network include a Random Access Channel (RACH) for transmission of initial control messages and an uplink SCH for transmission of user traffic or control messages.

Logical channels, which are located above the transport channels and are mapped to the transport channels, include a Broadcast Control Channel (BCCH), a Paging Control Channel (PCCH), a Common Control Channel (CCCH), a Multicast Control Channel (MCCH), and a Multicast Traffic Channel (MTCH).

FIG. 3 illustrates an example of a physical channel structure used in an E-UMTS system. A physical channel includes a plurality of subframes in the time axis and a plurality of subcarriers in the frequency axis. Here, one subframe includes a plurality of symbols in the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PDCCH), that is, an L1/L2 control channel. An L1/L2 control information transmission region (PDCCH) and a data transmission region (PDSCH) are shown in FIG. 3. The Evolved Universal Mobile Telecommunications System (E-UMTS), which is currently under discussion, uses 10 ms radio frames, each including 10 subframes. Each subframe includes two consecutive slots, each of which is 0.5 ms long. One subframe includes multiple OFDM symbols. Some (for example, the first symbol) of the OFDM symbols can be used to transmit L1/L2 control information. A Transmission Time Interval (TTI), which is a unit time during which data is transmitted, is 1 ms.

The eNB and the UE transmit and receive most data other than a specific control information or specific service data through a PDSCH, which is a physical channel, using a DL-SCH which is a transport channel. Information indicating a UE (one or a plurality of UEs) to which PDSCH data is transmitted and indicating how the UEs receive and decode PDSCH data is transmitted through the PDCCH.

For example, let us assume that a specific PDCCH has been CRC-masked with a Radio Network Temporary Identity (RNTI) "A" and information associated with data transmitted using transport format information (e.g., transport block size, modulation, coding information, etc) "C" and a radio resource (e.g., a frequency position) "B" is transmitted through a specific subframe. Under this assumption, if one or more specific UEs contain the RNTI "A" among UEs in a cell which are monitoring the PDCCH using RNTI information contained in the UEs, the specific UEs receive the PDCCH and receive a PDSCH indicated by "B" and "C" through the received PDCCH information. That is, the PDCCH transmits downlink scheduling information of a specific UE and the PDSCH transmits downlink data corresponding to the downlink scheduling information. The PDCCH can also transmit uplink scheduling information of a specific UE.

FIG. 4 is a block diagram of a transmitter according to a Single Carrier-Frequency Division Multiple Access (SC-FDMA) scheme.

As shown in FIG. 4, the SC-FDMA transmitter includes a DFT unit 410 that performs Discrete Fourier Transform (DFT), a subcarrier mapper 420, and an IFFT unit 430 that performs Inverse Fast Fourier Transform (IFFT).

The DFT unit 410 performs DFT on received time-domain data and outputs frequency-domain symbols. The subcarrier mapper 420 maps frequency-domain symbols to subcarriers. The IFFT unit 430 performs IFFT on received frequency-domain symbols and outputs a time-domain signal FIG. 5 illustrates a structure of a radio frame used for uplink transmission.

As shown in FIG. 5, one radio frame includes 10 subframes and each subframe includes 2 slots. The time required to transmit one subframe is referred to as a "Transmission Time Interval (TTI)". For example, the length of each subframe may be 1 ms and the length of each slot may be 0.5 ms. One slot includes a plurality of SC-FDMA symbols in the time domain and includes a plurality of resource blocks in the frequency domain. This radio frame structure is only illustrative and the number of subframes included in a radio frame, the number of slots included in a subframe, or the number of SC-FDMA symbols included in a slot may vary.

FIG. 6 illustrates a resource grid of an uplink slot.

As shown in FIG. 6, one uplink slot includes a plurality of SC-FDMA symbols in the time domain and includes a plurality of resource blocks in the frequency domain. Although one uplink slot includes 7 SC-FDMA symbols and one resource block includes 12 subcarriers in the example of FIG. 6, this structure is only illustrative. For example, the number of SC-FDMA symbols included in one uplink slot may be changed according to the length of a Cyclic Prefix (CP).

Each element in the resource grid is referred to as a resource element. One resource block includes 12×7 resource elements. The number of resource blocks ($N^{UL}$) included in one uplink slot depends on an uplink transmission bandwidth set in the cell.

FIG. 7 illustrates a structure of an uplink subframe to which SC-FDMA is applied.

As shown in FIG. 7, an uplink subframe can be divided into a region to which a Physical Uplink Control Channel (PUCCH) carrying uplink control information is allocated and a region to which a Physical Uplink Shared Channel (PUSCH) carrying user data is allocated. A middle portion of the subframe is allocated to the PUSCH and both side portions of a data region in the frequency domain are allocated to the PUCCH. The UE does not simultaneously transmit the PUCCH and the PUSCH.

Uplink control information transmitted in the PUCCH includes an Acknowledgement (ACK)/Negative-Acknowledgement (NACK) signal used to perform Hybrid Automatic Repeat Request (HARQ), a Channel Quality Indicator (CQI) indicating a downlink channel status, and a scheduling request signal which serves to request allocation of uplink radio resources. As an exception, if a PUSCH transmission is present while the uplink control information is transmitted, the UE transmits the uplink control information using the PUSCH.

A PUCCH for one UE uses one resource block that occupies a different frequency in each of the two slots in one subframe. The two slots use different resource blocks (or subcarriers) in the subframe. That is, the two resource blocks allocated to PUCCHs are subjected to frequency hopping in the slot boundary. In the example illustrated in FIG. 7, a PUCCH of m=0, a PUCCH of m=1, a PUCCH of m=2, and a PUCCH of m=3 (PUCCHs for 4 UEs) are allocated to a subframe.

The PUCCH can support multiple formats. That is, the PUCCH can transmit uplink control information having a different number of bits per subframe depending on the modulation scheme. For example, 1-bit uplink control information can be transmitted through the PUCCH when Binary Phase Shift Keying (BPSK) is used and 2-bit uplink control information can be transmitted through the PUCCH when Quadrature Phase Shift Keying (QPSK) is used.

FIG. 8 illustrates a random access procedure.

The random access procedure is used to transmit short-length data in uplink. For example, the random access procedure is performed upon initial access in an RRC idle mode, upon initial access after radio link failure, upon handover requiring the random access procedure, and upon the occurrence of uplink/downlink data requiring the random access procedure during an RRC connected mode. Some RRC messages such as an RRC connection request message, a cell update message, and a URA update message are transmitted using a random access procedure. Logical channels such as a Common Control Channel (CCCH), a Dedicated Control Channel (DCCH), or a Dedicated Traffic Channel (DTCH) can be mapped to a transport channel (RACH). The transport channel (RACH) can be mapped to a physical channel (e.g., Physical Random Access Channel (PRACH)). When a UE MAC layer instructs a UE physical layer to transmit a PRACH, the UE physical layer first selects an access slot and a signature and transmits a PRACH preamble in uplink. The random access procedure is divided into a contention-based procedure and a non-contention-based procedure.

As shown in FIG. 8, a UE receives and stores information regarding random access from an eNB through system information. Thereafter, when random access is needed, the UE transmits a random access preamble (Message 1) to the eNB (S810). Upon receiving the random access preamble from the UE, the eNB transmits a random access response message (Message 2) to the UE (S820). Specifically, downlink scheduling information for the random access response message can be CRC-masked with a Random Access-RNTI and can be transmitted through an L1/L2 control channel (PDCCH). Upon receiving the downlink scheduling signal masked with the RA-RNTI, the UE can receive and decode a random access response message from a Physical Downlink Shared Channel (PDSCH). Thereafter, the UE checks whether or not random access response information corresponding to the UE is present in the received random access response message. Whether or not random access response information corresponding to the UE is present can be determined based on whether or not a Random Access preamble ID (RAID) for the preamble that the UE has transmitted is present. The random access response information includes Timing Advance (TA) indicating timing offset information for synchronization, information of allocation of radio resources used in uplink, and a temporary identity (e.g., T-CRNTI) for user identification. Upon receiving the random access response information, the UE transmits an uplink message (Message 3) through an uplink Shared Channel (SCH) according to radio resource allocation information included in the response information (S830). After receiving the uplink message from the UE, the eNB transmits a contention resolution message (Message 4) to the UE (S840).

As in the 3GPP LTE system, uplink packets in a cellular radio packet transmission system which uses the SC-FDMA scheme for uplink transmission are discriminated as they use different time-frequency resources. In the case where an SC-FDMA UE transmits a signal using two or more frequency regions that are not adjacent in the frequency axis at the same time (or the same subframe), single-carrier characteristics of the SC-FDMA are degraded and thus it is necessary to increase the dynamic range of a transmission amplifier of the UE. Accordingly, in order to maintain the single-carrier characteristics of the SC-FDMA, it is preferable that the UE transmit a signal using subcarriers that are adjacent in the frequency axis. In the Time Division Multiple Access (TDMA) system, it may also be undesirable to allow one UE to simultaneously transmit two or more packets with different characteristics for a variety of technical reasons.

SUMMARY OF THE INVENTION

Accordingly, the present invention is directed to a method for resolving collision of signals transmitted in uplink in a wireless communication system which substantially obviates one or more problems due to limitations and disadvantages of the related art.

An object of the present invention is to provide a method for efficiently performing data transmission when different data transmission procedures are performed together in a wireless communication system.

Another object of the present invention is to provide a method for efficiently performing data transmission when a separate uplink transmission procedure/downlink transmission procedure is performed together with uplink transmission of a random access procedure.

Another object of the present invention is to provide a method for efficiently performing data transmission when uplink transmission associated with control information is performed together with uplink transmission of a random access procedure.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for processing data in a wireless communication system includes receiving a first uplink scheduling command indicating a first radio resource, receiving a second uplink scheduling command indicating a second radio resource through a random access response, and stopping a procedure associated with the second uplink scheduling command when the first radio resource and the second radio resource collide.

Preferably, the wireless communication system can support at least one of a Single Carrier-Frequency Division Multiple Access (SC-FDMA) scheme, a Multi-Carrier-Frequency Division Multiple Access (MC-FDMA) scheme, and an Orthogonal Frequency Division Multiple Access (OFDMA) scheme for uplink transmission. More preferably, the wireless communication system can support the SC-FDMA scheme for uplink transmission.

Preferably, the collision of the first radio resource and the second radio resource includes overlapping of at least a part of a time resource and a frequency resource indicated by the first radio resource and the second radio resource. More preferably, the collision of the first radio resource and the second radio resource includes overlapping of at least a part of a time resource or time/frequency resources indicated by the first radio resource and the second radio resource. Here, the time resource may be indicated on a TTI basis or a subframe basis.

Accordingly, the collision of the first radio resource and the second radio resource preferably includes a state in which the first radio resource and the second radio resource indicate the same TTI or subframe.

In another aspect of the present invention, a method for processing data while random access is performed in a wireless communication system includes receiving a first uplink scheduling command through a random access response, receiving downlink information at the time when or after the random access response is received, and stopping a procedure associated with the downlink information.

Preferably, the wireless communication system can support at least one of the SC-FDMA scheme, the MC-FDMA scheme, and the OFDMA scheme for uplink transmission. More preferably, the wireless communication system can support the SC-FDMA scheme for uplink transmission.

Preferably, the random access response and the downlink information are received through the same TTI or subframe. Preferably, the random access response and the downlink information are received through a PDSCH. Preferably, the random access response and the downlink information are indicated respectively by a PDCCH masked with an RA-RNTI and a PDCCH masked with a Cell-RNTI (C-RNTI). Preferably, the PDCCH masked with the C-RNTI is not decoded or is ignored.

Preferably, the step of stopping the procedure associated with the downlink information includes omitting decoding of the downlink information or ignoring the downlink information.

In another aspect of the present invention, a method for transmitting uplink data in a wireless communication system includes receiving a first uplink scheduling command indicating a first radio resource through a random access response, determining a second radio resource for transmission of an uplink control information, and stopping the transmission of the uplink control information when the first radio resource and the second radio resource collide.

Preferably, the wireless communication system can support at least one of the SC-FDMA scheme, the MC-FDMA scheme, and the OFDMA scheme for uplink transmission. More preferably, the wireless communication system can support the SC-FDMA scheme for uplink transmission.

Preferably, the uplink control information includes an Acknowledgment (ACK)/Negative-Acknowledgement (NACK) signal used to perform Hybrid Automatic Repeat Request (HARQ), a Channel Quality Indicator (CQI) indicating a downlink channel status, and a scheduling request signal which serves to request allocation of uplink radio resources.

Preferably, the collision of the first radio resource and the second radio resource includes overlapping of at least a part of a time resource and a frequency resource indicated by the first radio resource and the second radio resource. More preferably, the collision of the first radio resource and the second radio resource includes overlapping of at least a part of a time resource or time/frequency resources indicated by the first radio resource and the second radio resource. Here, the time resource may be indicated on a TTI basis or a subframe basis. Accordingly, the collision of the first radio resource and the second radio resource preferably includes a state in which the first radio resource and the second radio resource indicate the same TTI or subframe. Preferably, the method may further include transmitting uplink data according to the first uplink scheduling command through a PUSCH.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 2 illustrates the configurations of a radio interface protocol between the E-UTRAN and a UE;

DETAILED DESCRIPTION OF THE INVENTION

Figure 1:
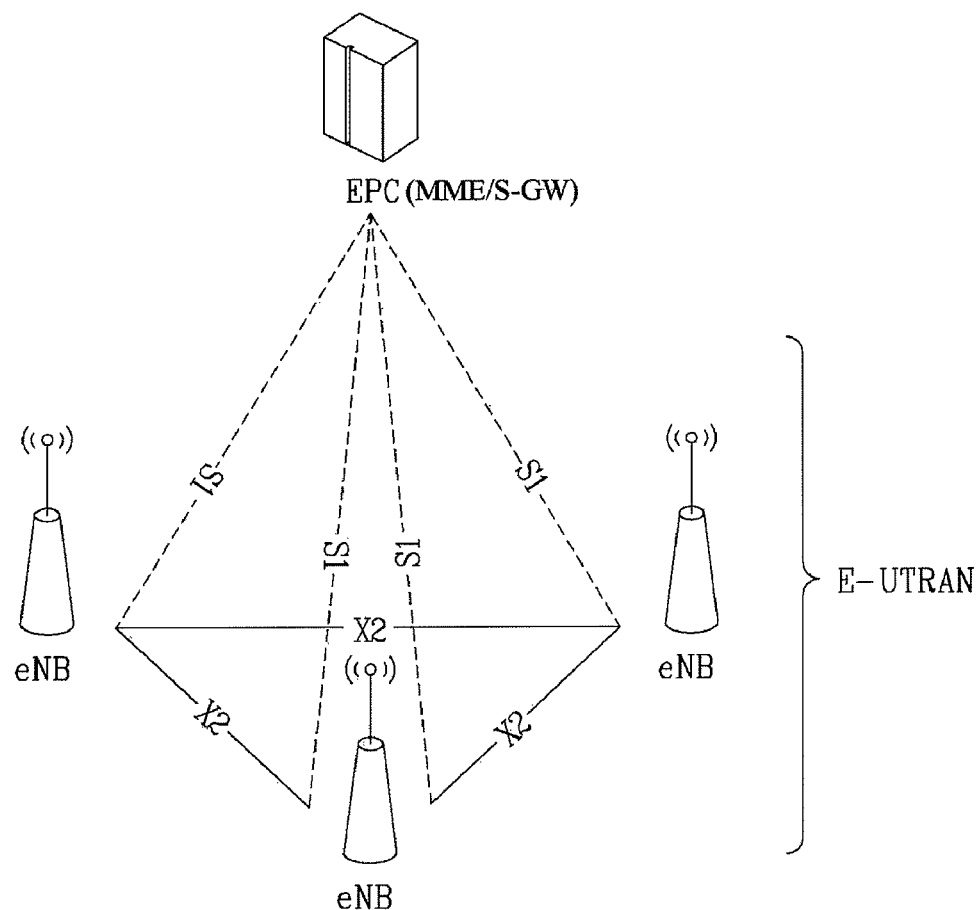
FIG. 1 illustrates a schematic structure of an Evolved Universal Terrestrial Radio Access Network (E-UTRAN)
Figure 3:
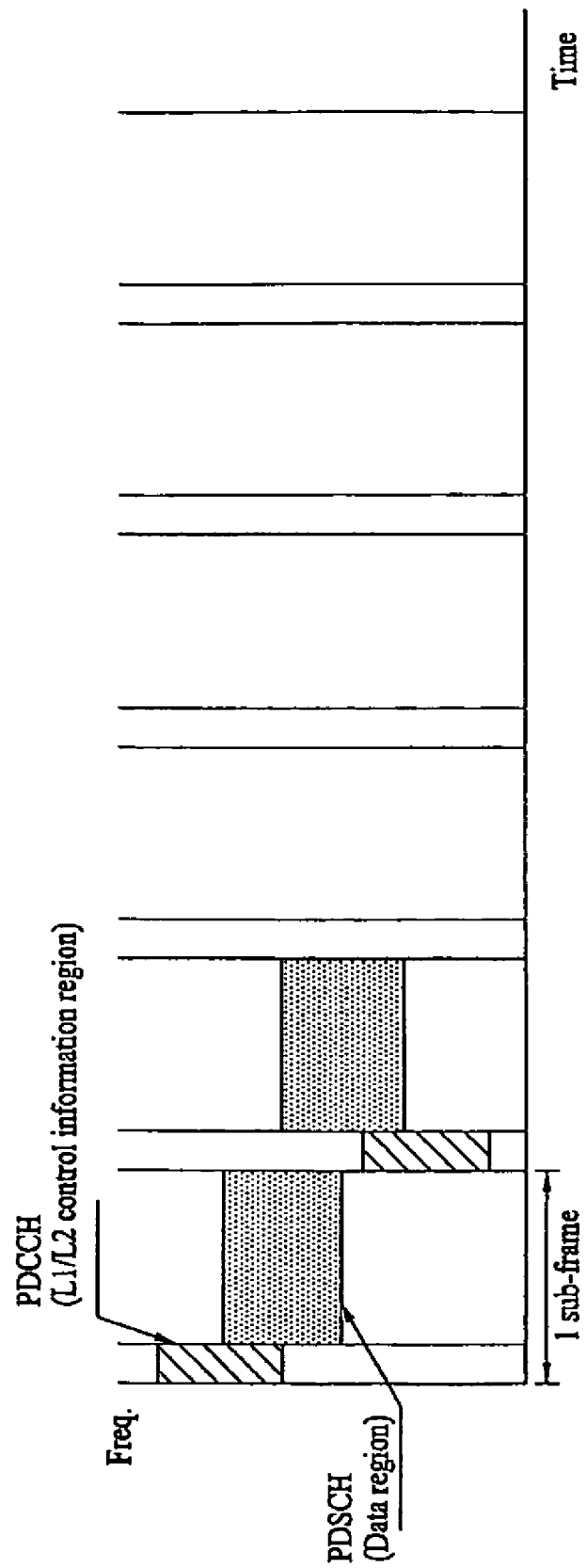
FIG. 3 illustrates an example physical channel structure used in an E-UMTS system.
Figure 4:
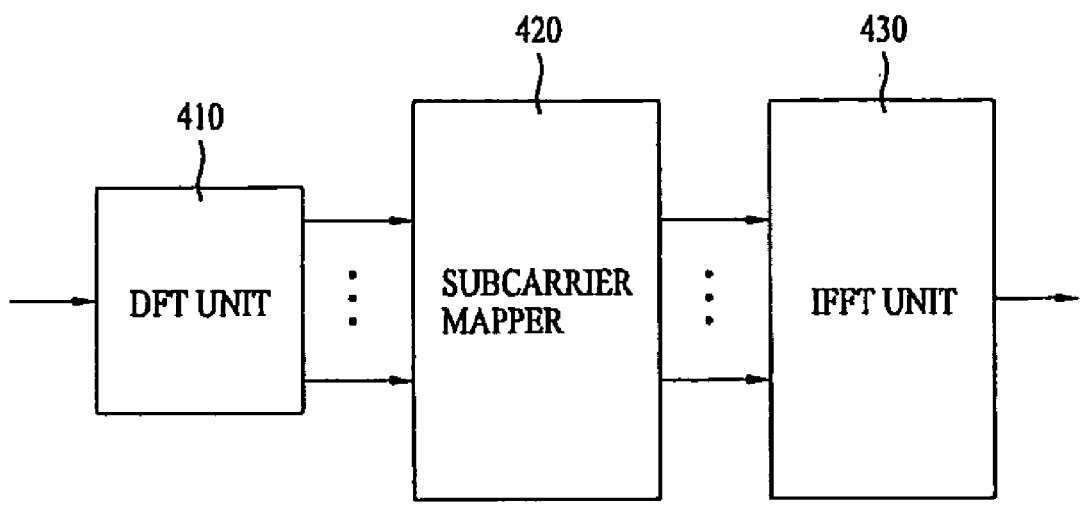
FIG. 4 is a block diagram of a transmitter according to a Single Carrier-Frequency Division Multiple Access (SC-FDMA) scheme.
Figure 5:
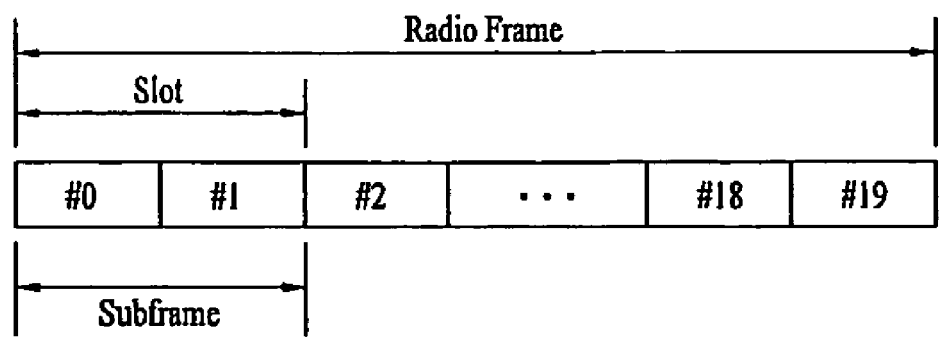
FIG. 5 illustrates a structure of a radio frame used for uplink transmission.
Figure 6:
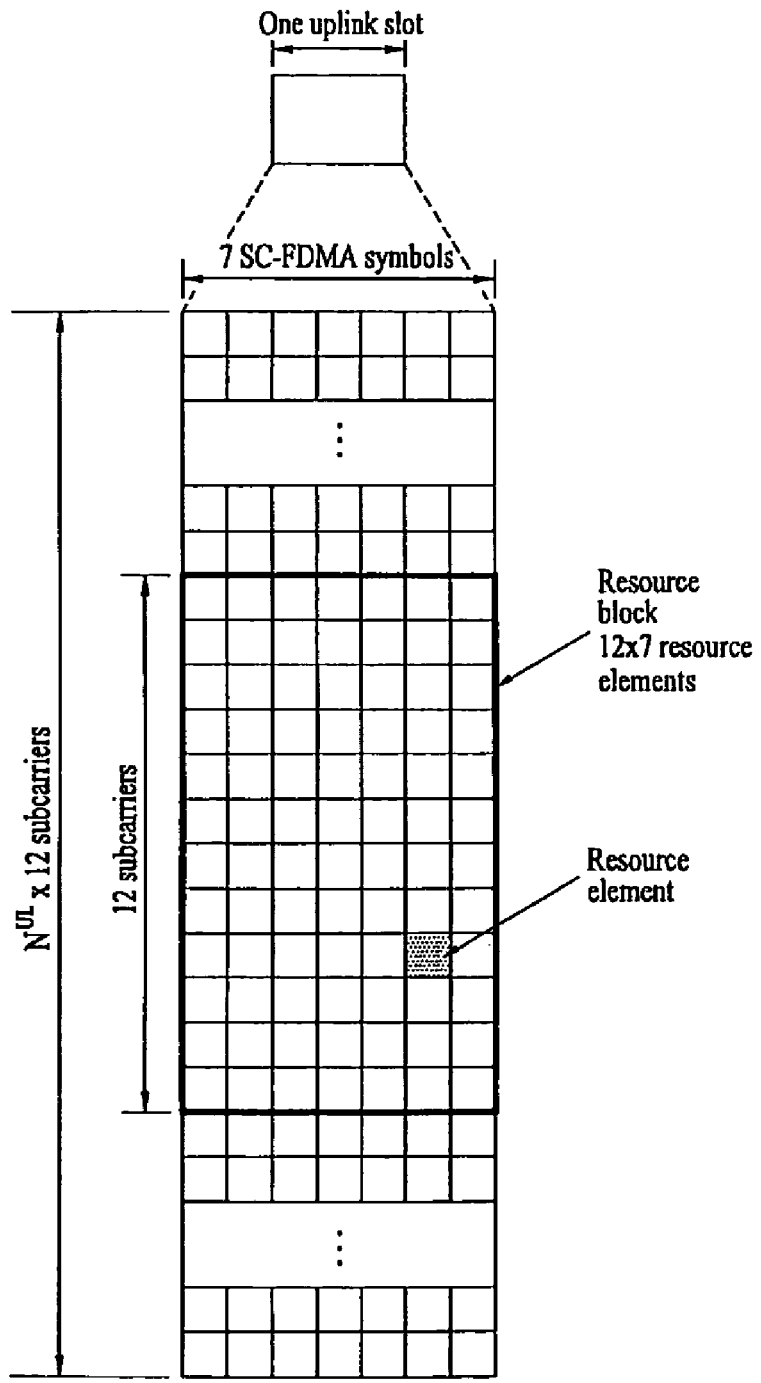
FIG. 6 illustrates a resource grid of an uplink slot.
Figure 7:
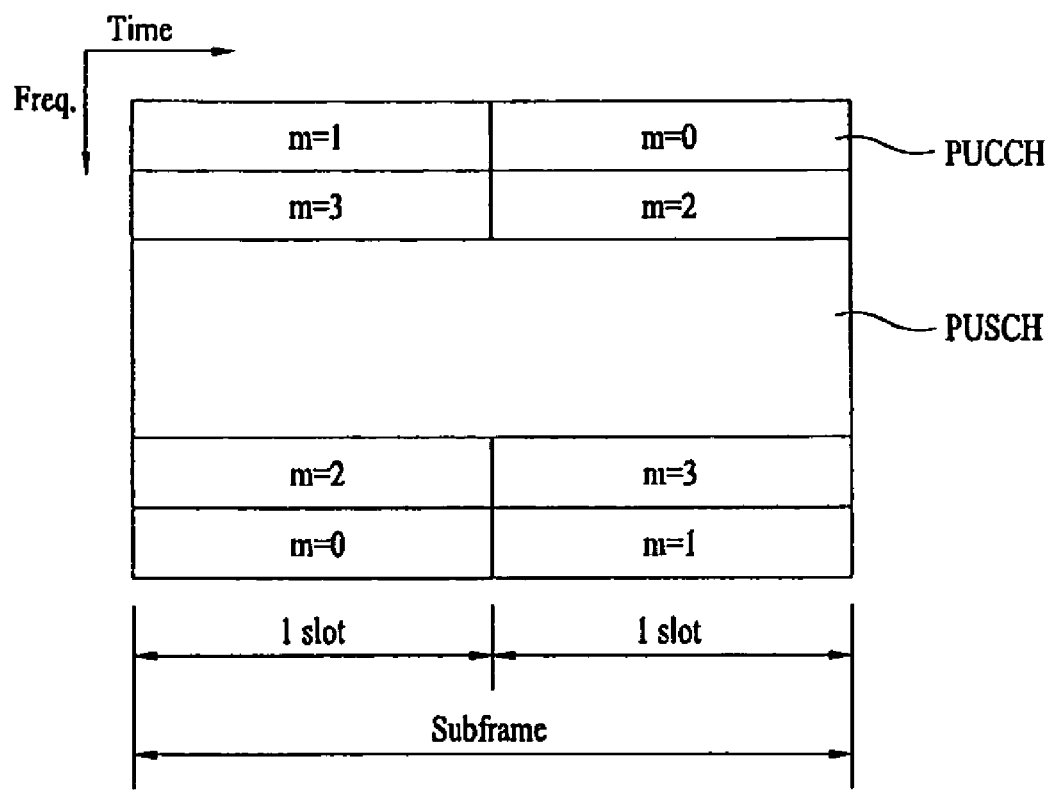
FIG. 7 illustrates a structure of an uplink subframe to which SC-FDMA is applied.
Figure 8:
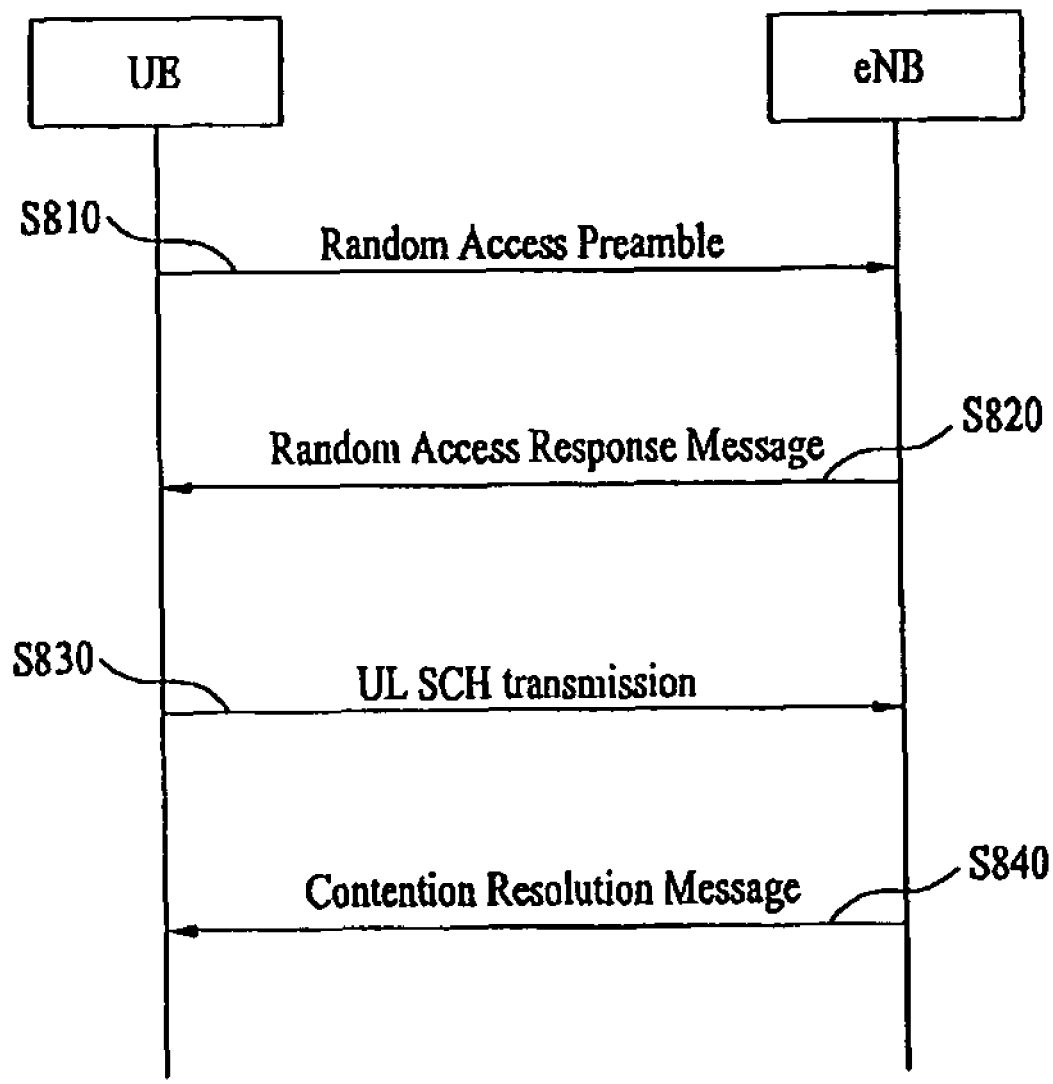
FIG. 8 illustrates a random access procedure.

The above and other configurations, operations, and features of the present invention will be easily understood from the embodiments of the invention described below with reference to the accompanying drawings. The embodiments described below are examples wherein technical features of the invention are applied to a wireless communication system. Preferably, the wireless communication system can support at least one of SC-FDMA, MC-FDMA, and OFDMA schemes. More preferably, the wireless communication system can support the SC-FDMA scheme.

In the present invention, packets transmitted through a random access procedure and packets transmitted through other uplink transmission procedures are treated as uplink packets with different characteristics. In the description of the present invention, a packet that is transmitted in uplink through a random access procedure is referred to as a "random access packet" or "random access physical uplink shared channel (RA-PUSCH)" for better understanding of the present invention. Similarly, a packet that is transmitted in uplink through an uplink transmission procedure other than the random access procedure is referred to as a "general data packet" or "physical uplink shared channel (PUSCH)".

In the description of the present invention, collision between radio resources for signal transmission indicates that at least a part of time and frequency resources for signal transmission overlaps if not explicitly stated otherwise. Preferably, collision between radio resources indicates that at least a part of time resources or time/frequency resources for signal transmission overlaps. Here, time resources may be indicated on a TTI basis or a subframe basis. Accordingly, overlapping of at least a part of time resources indicates that different signals are transmitted through the same TTI or the same subframe.

In the description of the present invention, ignoring a signal/command indicates that decoding only is performed on the signal/command and no subsequent processes are performed thereon, if not explicitly stated otherwise. For example, ignoring an RA-PUSCH transmission command indicates that, although decoding is performed on the RA-PUSCH transmission command for identifying the RA-PUSCH transmission command, no processes associated with the RA-PUSCH transmission command are performed after the RA-PUSCH transmission command is identified.

If an eNB transmits an uplink scheduling command to a UE in a general situation, the UE receives the scheduling command and transmits data through a PUSCH at a time indicated by the scheduling command or at a time fixed relative to the time at which the scheduling command is received. On the other hand, if the UE has received no uplink scheduling command although a transmission buffer contains data to be transmitted, the UE may attempt uplink data transmission through an RA-PUSCH. Specifically, the UE transmits an RA-preamble signal and the eNB transmits an RA-response signal to the UE. The UE transmits an RA-PUSCH according to an uplink scheduling command included in the RA-response. When the UE has received no RA-response, the UE may attempt to retransmit the RA-preamble signal according to preset rules.

The RA-preamble cannot carry an amount of information required to represent a unique ID of the UE or an ID in the system. Accordingly, the eNB cannot identify a UE which has attempted random access until the eNB receives an ID that the UE has transmitted through an RA-PUSCH. For this reason, a time that the eNB has allocated to the UE to transmit an RA-PUSCH may collide with an uplink time that the eNB has allocated to the UE to transmit a PUSCH according to a general uplink scheduling procedure.

The present invention suggests a variety of methods to overcome such problems.

Embodiment 1

Discard RA-PUSCH when PUSCH and RA-PUSCH Collide

When a UE has received both a general PUSCH transmission command and an RA-PUSCH transmission command and radio resources indicated by the received general PUSCH transmission command and RA-PUSCH transmission command collide, the UE may ignore the RA-PUSCH transmission command and transmit a general PUSCH according to the general PUSCH transmission command. Preferably, when a UE has received both a general PUSCH transmission command and an RA-PUSCH transmission command for the same time, the UE may ignore the RA-PUSCH transmission command and transmit a general PUSCH according to the general PUSCH transmission command. By ignoring the RA-PUSCH transmission command, the UE can transmit only one PUSCH in the SC-FDMA system, thereby maintaining single-carrier characteristics.

The main reason why the RA-PUSCH is discarded is that the RA-PUSCH may collide with an RA-PUSCH transmitted by another UE that has transmitted the same RA-preamble. Accordingly, the eNB can more successfully receive a PUSCH transmitted through a general scheduling command rather than through a random access scheme. The UE can also transmit information corresponding to a scheduling request or a transmission buffer status through the PUSCH. Details of this method are illustrated in FIG. 9.

Figure 9:
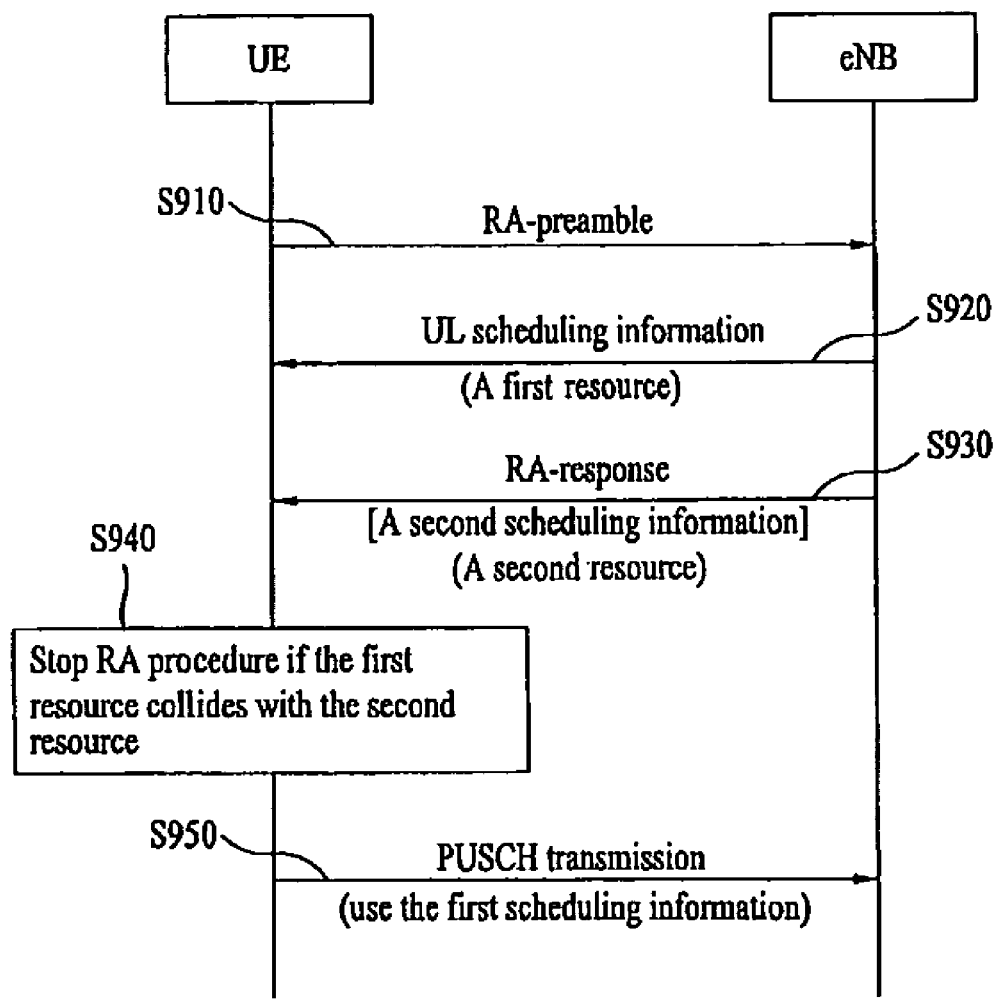
FIG. 9 illustrates example operations of a UE when two or more uplink transmissions collide according to an embodiment of the present invention.

As shown in FIG. 9, the UE transmits an RA-preamble to the eNB when the UE has data to be transmitted (S910). The eNB cannot identify the UE although the eNB has successfully received the RA-preamble from the UE. In this state, regardless of the random access procedure, the eNB transmits an uplink scheduling command to the UE in order to receive data from the UE (S920). The uplink scheduling command indicates a first radio resource. Thereafter, the eNB transmits random access response information (RA-response) including a timing offset for transmission timing control, information of allocation of resources for uplink transmission, and a temporary identity to the UE as a response to the RA-preamble (S930). The information of resource allocation for UE transmission indicates a second radio resource. If the UE has received different uplink scheduling information, then the UE checks whether or not the radio resources collide. Preferably, the collision of radio resources includes collision of time resources or time/frequency resources. Preferably, the different uplink scheduling information may indicate the same TTI or subframe. When the first radio resource and the second radio resource collide, the UE ignores the RA-response received at step S930 and stops the random access procedure (S940). Thereafter, the UE performs PUSCH transmission using the uplink scheduling information. The order in which the uplink scheduling information transmission and the RA-response transmission are performed may be reversed.

Embodiment 2

Ignore PUSCH Transmission Command During Random Access Procedure

The UE may not decode or may ignore a general PUSCH uplink scheduling command during all or part of the period until the UE receives an RA-response and transmits an RA-PUSCH after starting RA-preamble transmission. The UE can also ignore a general PUSCH uplink scheduling command during all or part of the period until the UE terminates the random access attempt after starting RA-preamble transmission. This method eliminates the need for the UE, which attempts random access, to simultaneously transmit the RA-PUSCH and the PUSCH. This method also eliminates the burden of the UE, which attempts random access, having to decode both the general PUSCH uplink scheduling signal and the RA-response. Details of this method are illustrated in FIGS. 10-13.

Figure 10:
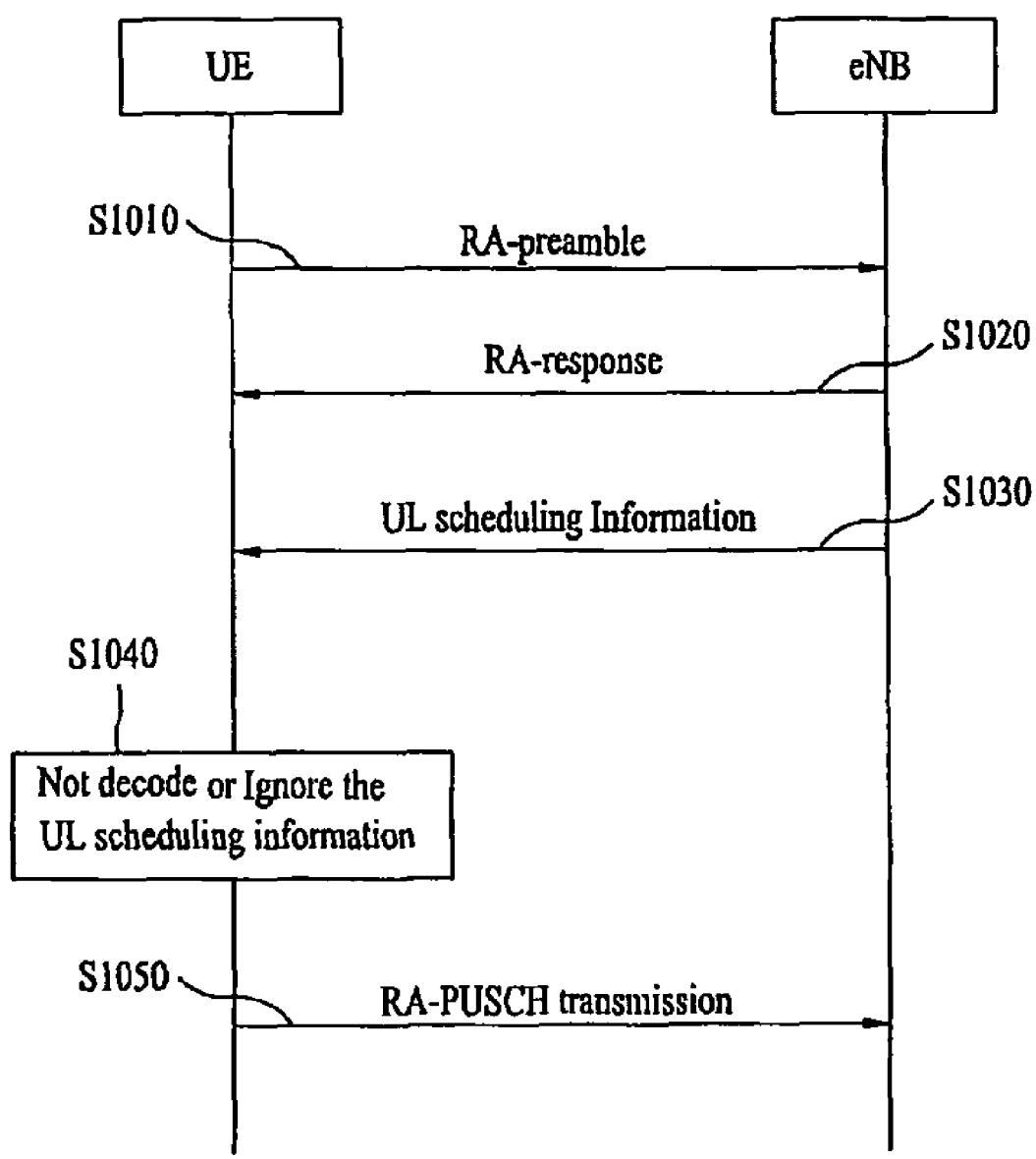
FIGS. 10-13 illustrate example operations of a UE when two or more uplink transmission procedures are performed together according to another embodiment of the present invention.

As shown in FIG. 10, a UE transmits an RA-preamble to an eNB (S1010). In the case where the eNB has successfully received the RA-preamble, the eNB transmits an RA-response including information of resource allocation for uplink transmission to the UE (S1020). Simultaneously with or after transmitting the RA-response, the eNB transmits a separate uplink scheduling command to the UE without knowing that the UE is performing a random access procedure (S1030). Here, transmitting the uplink scheduling command simultaneously with the RA-response indicates that the uplink scheduling command and the RA-response are transmitted through the same TTI or the same subframe. In this case, the UE does not decode or ignores the uplink scheduling command received after the RA-preamble is transmitted (S1040). That is, during the random access procedure, the UE may not decode an uplink scheduling command or alternatively may omit processes associated with uplink transmission although the UE decodes the uplink scheduling command. Thereafter, the UE performs RA-PUSCH transmission using the information of resource allocation for uplink transmission included in the RA-response (S1050).

In order to simplify system implementation, in the example of FIG. 10, the UE does not take into consideration whether or not the radio resources (for example, time resources) of the RA-PUSCH and the general PUSCH collide. However, preferably, the UE may not decode or may ignore uplink scheduling information indicating a radio resource which collides with RA-PUSCH transmission. This example is illustrated in FIG. 11.

Figure 11:
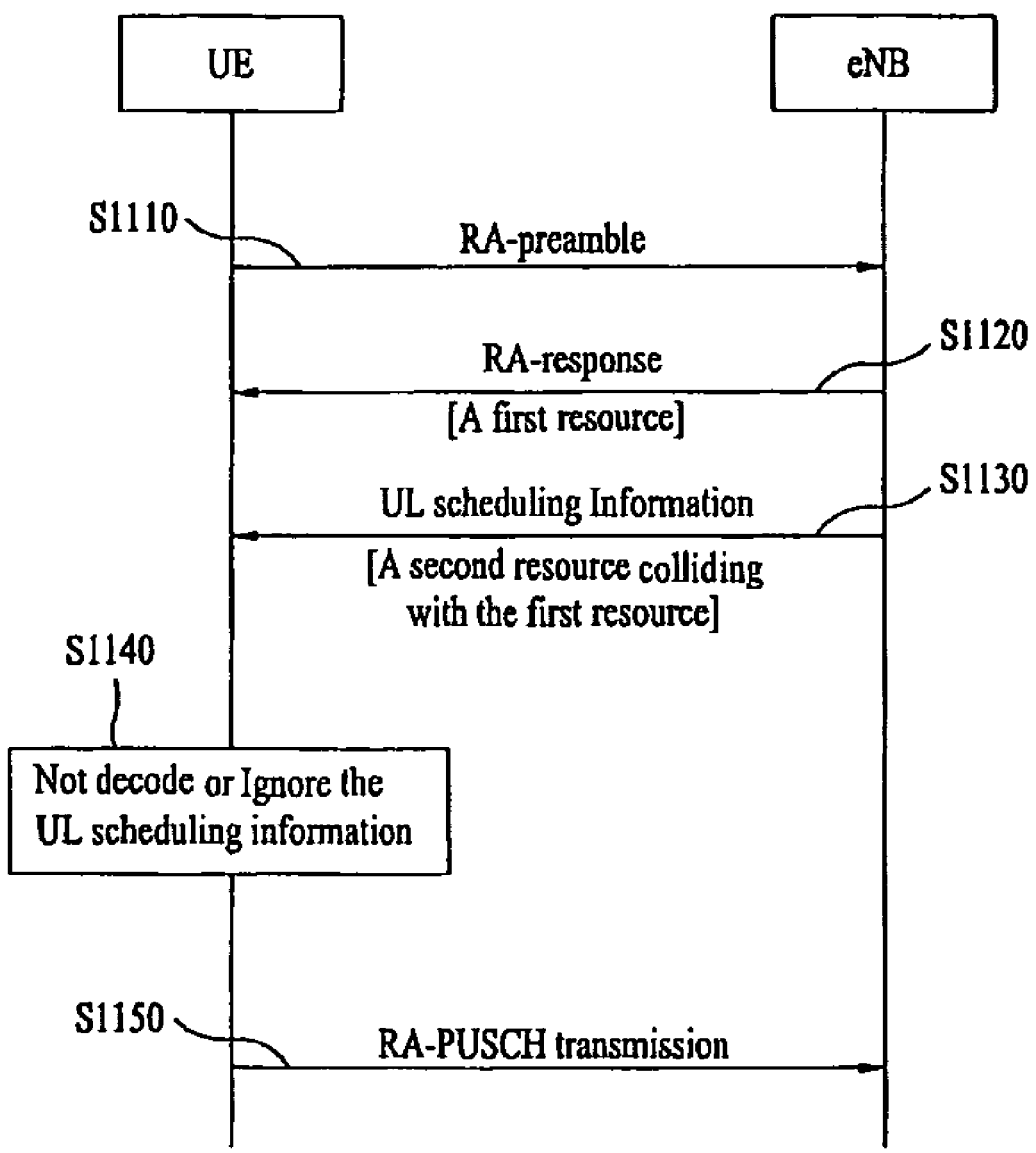

As shown in FIG. 11, it can be seen that the basic procedure of FIG. 11 is identical to that of FIG. 10. Specifically, steps S1110-S1150 correspond to steps S1010-S1050, respectively. The procedure of FIG. 11 differs from that of FIG. 10 in that the radio resources of the RA-PUSCH and the general PUSCH collide (S1120 and S1130). Preferably, the collision of radio resources includes overlapping of at least a part of time resources or time/frequency resources. When radio resources of the RA-PUSCH and the general PUSCH collide, the UE may not decode or may ignore uplink scheduling information regarding the general PUSCH (S1140). That is, during the random access procedure, the UE may not decode an uplink scheduling command or alternatively may omit processes associated with uplink transmission although the UE decodes the uplink scheduling command. On the other hand, if the radio resources of the RA-PUSCH and the general PUSCH do not collide, the UE may transmit both the RA-PUSCH and the general PUSCH using the different radio resources.

Figure 12:
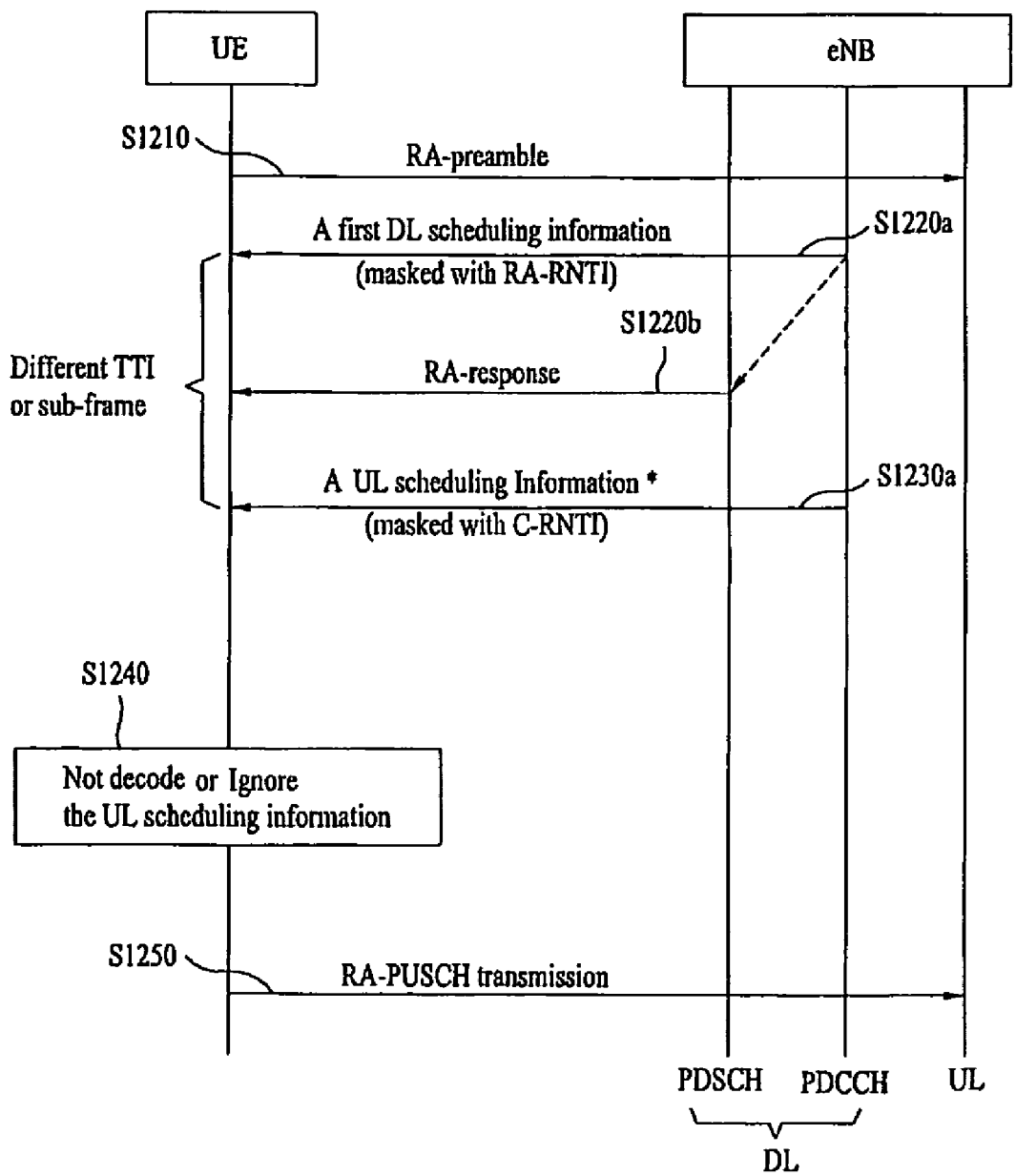
Figure 13:
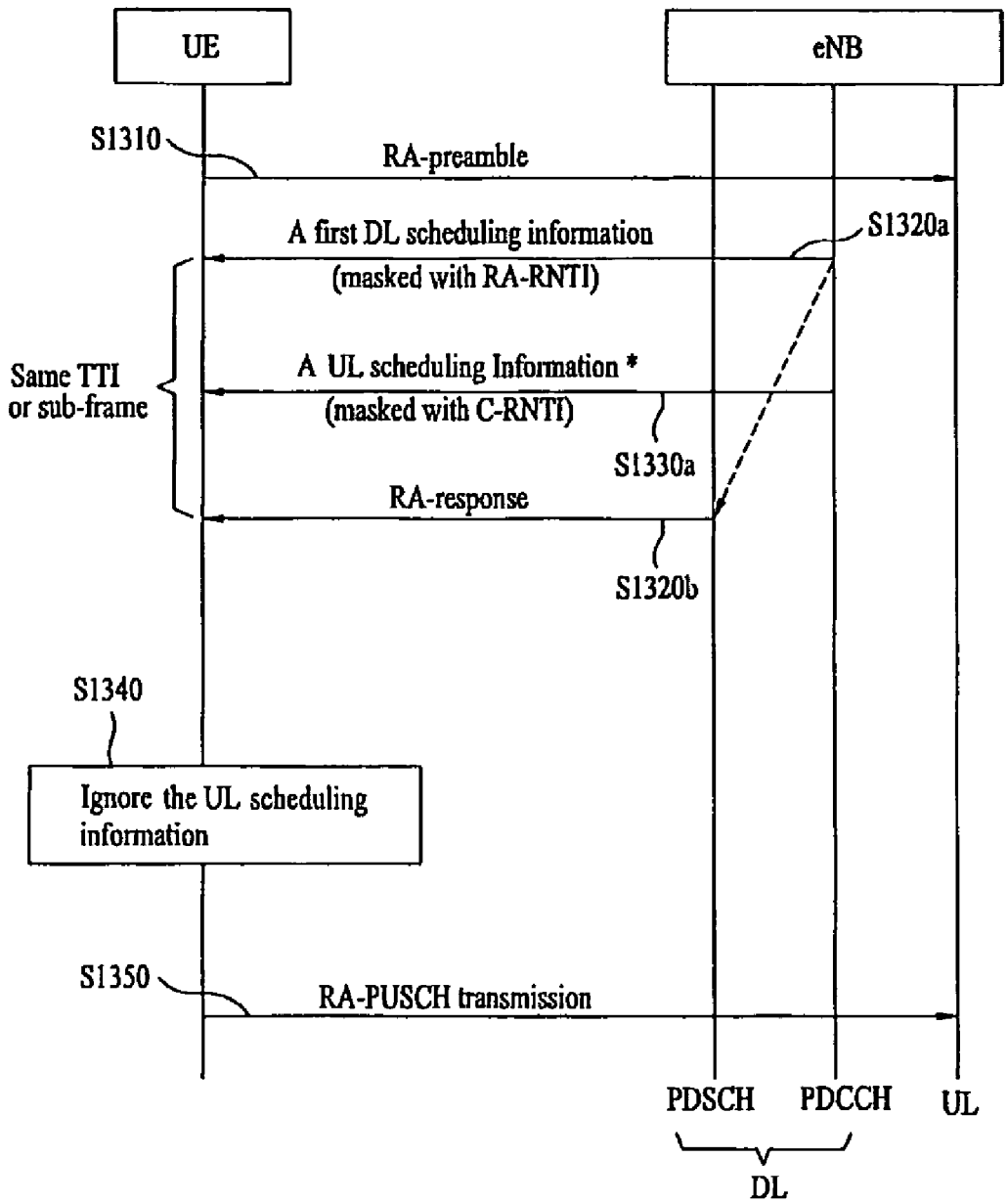

FIGS. 12 and 13 illustrate a more detailed version of the procedure of FIG. 11.

As shown in FIG. 12, a UE transmits an RA-preamble to an eNB (S1210). When the eNB has successfully received the RA-preamble, the eNB transmits RA-response scheduling information masked with an RA-RNTI through a PDCCH (S1220a). The RA-response scheduling information indicates a radio resource (PDSCH) through which an RA-response is transmitted. Thereafter, the eNB transmits the RA-response using the radio resource (PDSCH) indicated by the RA-response scheduling information (S1220b). Similarly, the eNB transmits uplink scheduling information masked with a C-RNTI through a PDCCH (S1230a). The uplink scheduling information may indicate a radio resource that collides with RA-PUSCH transmission.

In this case, the "RA-response scheduling information and RA-response" and the "uplink scheduling information" are transmitted to the UE through different TTIs or subframes. Because the RA-response scheduling information has been received, the UE knows that a random access procedure is in progress and therefore the UE may not decode or may ignore uplink scheduling information that is received thereafter (S1240). Thereafter, the UE performs RA-PUSCH transmission using information of resource allocation for uplink transmission included in the RA-response (S1250).

A procedure illustrated in FIG. 13 is identical to that of FIG. 12, except that the "RA-response scheduling information and RA-response" and the "uplink scheduling information" are transmitted to the UE through the same TTI or subframe. Specifically, steps S1310-S1350 correspond to steps S1210-S1250, respectively. Here, it is to be noted that, since the RA-response scheduling information masked with an RA-RNTI and the uplink scheduling information masked with a C-RNTI are transmitted through a PDCCH of the same TTI or subframe, the UE cannot determine the presence of RA-response scheduling information before the presence of uplink scheduling information not associated with the RA-response. Accordingly, the UE cannot ignore the uplink scheduling information even though the uplink scheduling information is not associated with the RA-response and should monitor the PDCCH using both the RA-RNTI and the C-RNTI. If the UE receives and decodes both the RA-response scheduling information and the uplink scheduling information, then the UE can detect the presence of the RA-response. In this case, the UE may ignore uplink scheduling information (PDSCH) not associated with the RA-response (S1340). That is, the UE may not perform uplink transmission processes associated with the uplink scheduling information.

Embodiment 3

Ignore Downlink Transmission Other than RA-Response During Random Access Procedure The UE may not decode or may ignore a downlink transmission (i.e., information transmitted in downlink) other than an RA-response in order to further reduce decoding load of the UE during a random access procedure. Further, the UE may not decode or may ignore downlink packet scheduling information associated with a downlink transmission other than the RA-response. However, the UE may decode downlink packets that do not require uplink transmission. For example, the UE may decode downlink scheduling information of downlink packets (for example, broadcast or multicast packets) which do not require ACK/NACK transmission and packets corresponding to the downlink scheduling information. Details of this method are illustrated in FIGS. 14-16.

Figure 14:
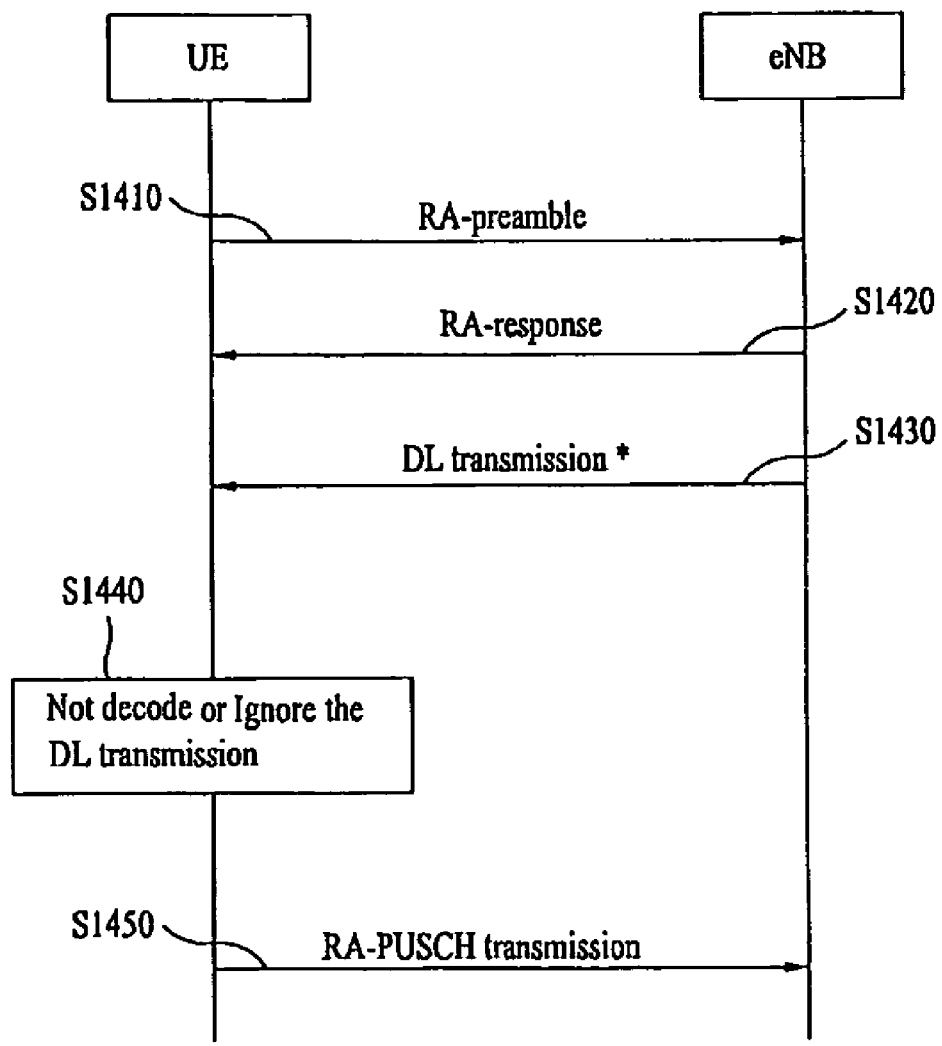
FIGS. 14-16 illustrate example operations of a UE when an uplink transmission procedure and a downlink transmission procedure are performed together according to another embodiment of the present invention.

As shown in FIG. 14, a UE transmits an RA-preamble to an eNB (S1410). In the case where the eNB has successfully received the RA-preamble, the eNB transmits an RA-response to the UE (S1420). Simultaneously with or after transmitting the RA-response, the eNB performs downlink transmission to the UE (S1430). Here, transmitting the downlink scheduling command simultaneously with the RA-response indicates that the downlink scheduling command and the RA-response are transmitted through the same TTI or the same subframe. The downlink transmission may require uplink transmission. Preferably, the downlink transmission may require uplink transmission, the radio resource of which collides with that of an RA-PUSCH transmission. Preferably, the collision of radio resources includes collision of time resources or time/frequency resources. Preferably, the uplink transmission due to the downlink transmission may indicate the same TTI or subframe as the RA-PUSCH is to be transmitted. In this case, the UE does not decode or ignores the downlink transmission received after the RA-preamble is transmitted (S1440). That is, during the random access procedure, the UE may not decode a downlink transmission even though the downlink transmission is received or alternatively may omit processes associated with downlink transmission although the UE decodes the downlink transmission. Thereafter, the UE performs RA-PUSCH transmission using the information of resource allocation for uplink transmission included in the RA-response (S1450).

Figure 15:
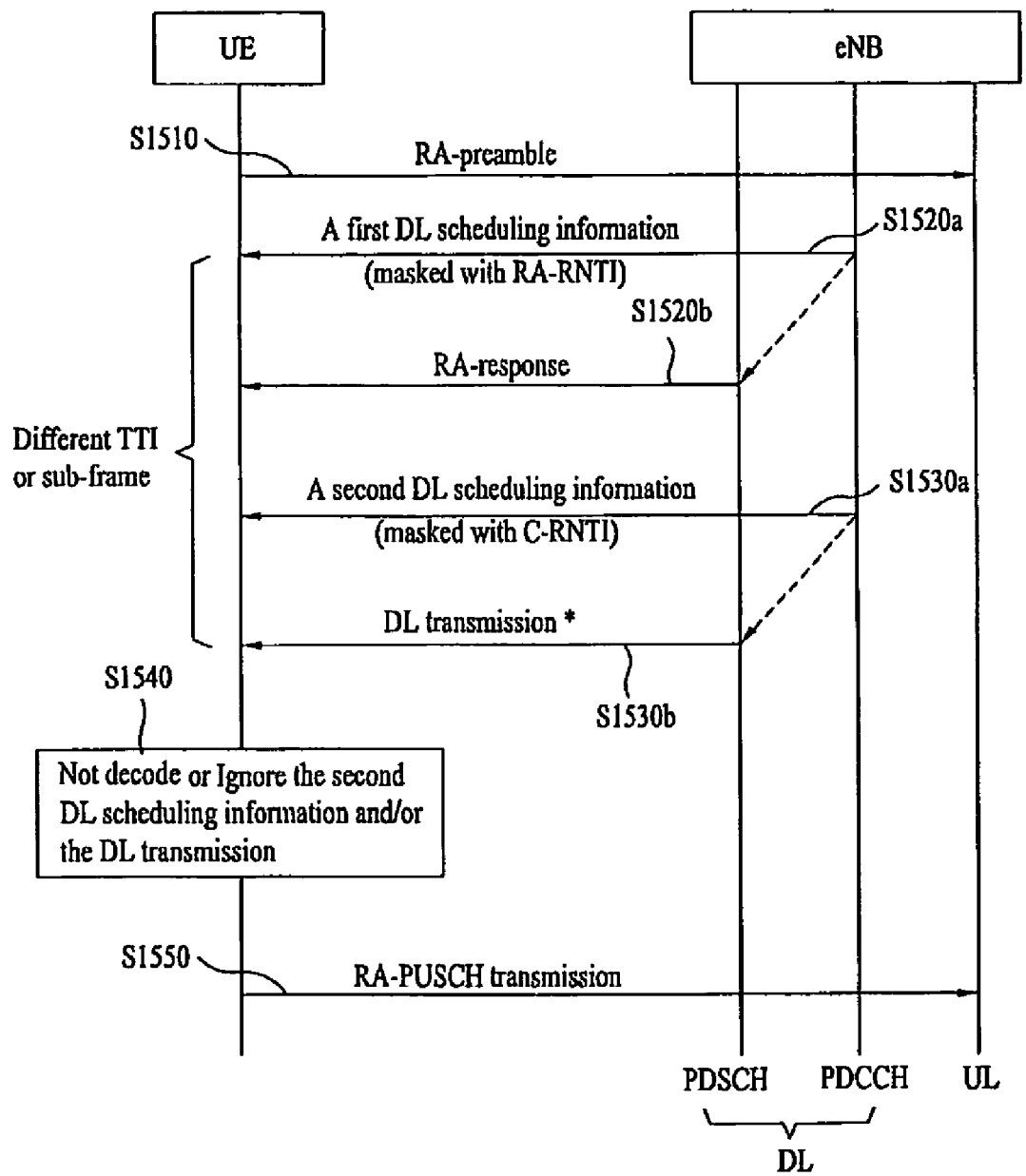
Figure 16:
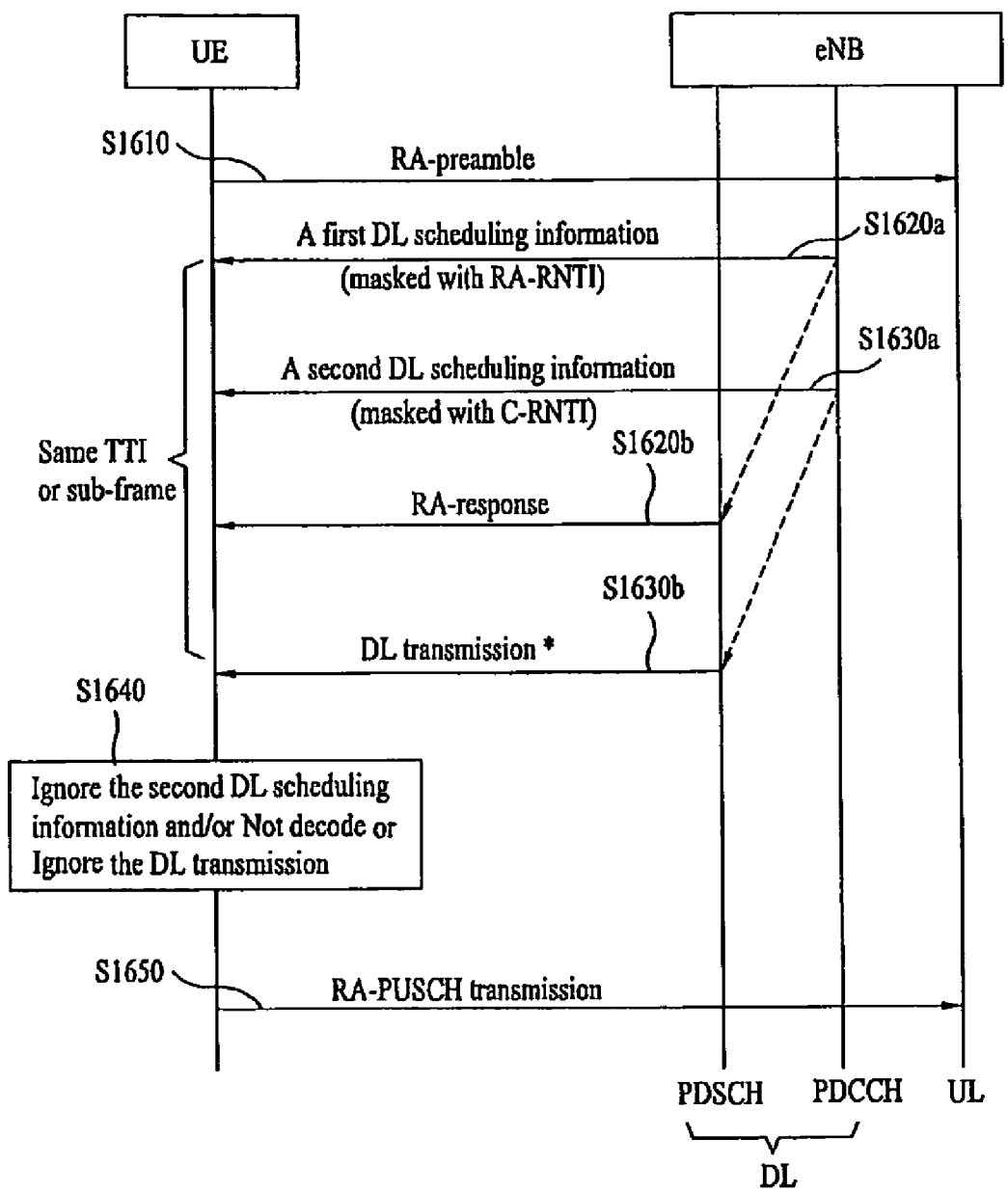

FIGS. 15 and 16 illustrate a more detailed version of the procedure of FIG. 14.

As shown in FIG. 15, a UE transmits an RA-preamble to an eNB (S1510). When the eNB has successfully received the RA-preamble, the eNB transmits first downlink scheduling information masked with an RA-RNTI through a PDCCH (S1520*a*). The first downlink scheduling information indicates a radio resource (PDSCH) through which an RA-response is transmitted. Thereafter, the eNB transmits the RA-response using the radio resource (PDSCH) indicated by the first downlink scheduling information (S1520*b*). Similarly, the eNB transmits second downlink scheduling information masked with a C-RNTI through a PDCCH (S1530*a*). The second downlink scheduling information indicates a radio resource (PDSCH) through which downlink information of the UE is transmitted. Thereafter, the eNB transmits the downlink information using the radio resource (PDSCH) indicated by the second downlink scheduling information (S1530*b*). The downlink information may require uplink transmission. Preferably, the downlink information may require uplink transmission, the radio resource of which collides with that of RA-PUSCH transmission.

In this case, the "first downlink scheduling information and RA-response" and the "second downlink scheduling information and downlink information" are transmitted to the UE through different TTIs or subframes. Because the first downlink scheduling information associated with the RA-response has been received, the UE knows that a random access procedure is in progress and therefore the UE may not decode or may ignore second downlink scheduling information and/or downlink information that is received thereafter (S1540). Thereafter, the UE performs RA-PUSCH transmission using information of resource allocation for uplink transmission included in the RA-response (S1550).

A procedure illustrated in FIG. 16 is identical to that of FIG. 15, except that the "first downlink scheduling information and RA-response" and the "second downlink scheduling information and downlink information" are transmitted to the UE through the same TTI or subframe. Specifically, steps S1610-S1650 correspond to steps S1510-S1550, respectively. Here, it is to be noted that, since the first downlink scheduling information masked with an RA-RNTI and the second downlink scheduling information masked with a C-RNTI are transmitted through a PDCCH of the same TTI or subframe, the UE cannot determine the presence of first downlink scheduling information associated with the RA-response before the presence of second downlink scheduling information not associated with the RA-response. Accordingly, the UE cannot omit decoding of second downlink scheduling information even though the scheduling information is not associated with the RA-response and should monitor the PDCCH using both the RA-RNTI and the C-RNTI. If the UE receives and decodes both the first downlink scheduling information and the second downlink scheduling information, then the UE can detect the presence of the RA-response. In this case, the UE can ignore the second downlink scheduling information. That is, the UE may omit processes associated with the second downlink scheduling information. Accordingly, the UE may not decode a downlink transmission received through a radio resource (PDSCH) indicated by the second downlink scheduling information. The UE may also ignore the downlink transmission although it decodes the downlink transmission (S1640).

The methods illustrated in the above embodiments may be combined according to the capabilities of the UE. For example, a UE that can decode both an RA-response and general uplink scheduling information can use the method illustrated in Embodiment 1. Other UEs may use the methods illustrated in Embodiment 2 and/or Embodiment 3.

As in the above case in which the RA-PUSCH and the PUSCH collide, the UE may need to transmit uplink control information at the time when an RA-PUSCH is to be transmitted. The uplink control information includes an ACK/NACK signal used to perform HARQ, a CQI indicating a downlink channel status, and a scheduling request signal which serves to request allocation of uplink radio resources. The present invention further suggests a method for increasing transmission efficiency when the UE needs to simultaneously transmit uplink control information and an RA-PUSCH.

Embodiment 4

Discard Transmission of Uplink Control Information when RA-PUSCH Collides with Uplink Transmission of Uplink Control Information Uplink control information is generally transmitted through a PUCCH. However, if a PUSCH transmission is present at the time when the uplink control information is to be transmitted, the UE transmits the uplink control information using the PUSCH. However, when radio resources for transmitting the RA-PUSCH and the uplink control information collide, the UE may transmit only the RA-PUSCH without transmitting the uplink control information. For example, when there is a need to also transmit an uplink control information at the time to transmit an RA-PUSCH, the UE may transmit only the RA-PUSCH without transmitting the uplink control information. For example, when there is a need to also transmit an ACK/NACK signal at the time to transmit an RA-PUSCH, the UE may transmit only the RA-PUSCH without transmitting the ACK/NACK signal. Since HARQ retransmission is applied to downlink packet transmission, it is possible to reconstruct the downlink packet transmission even if the ACK/NACK is not transmitted. Details of this method are illustrated in FIG. 17.

Figure 17:
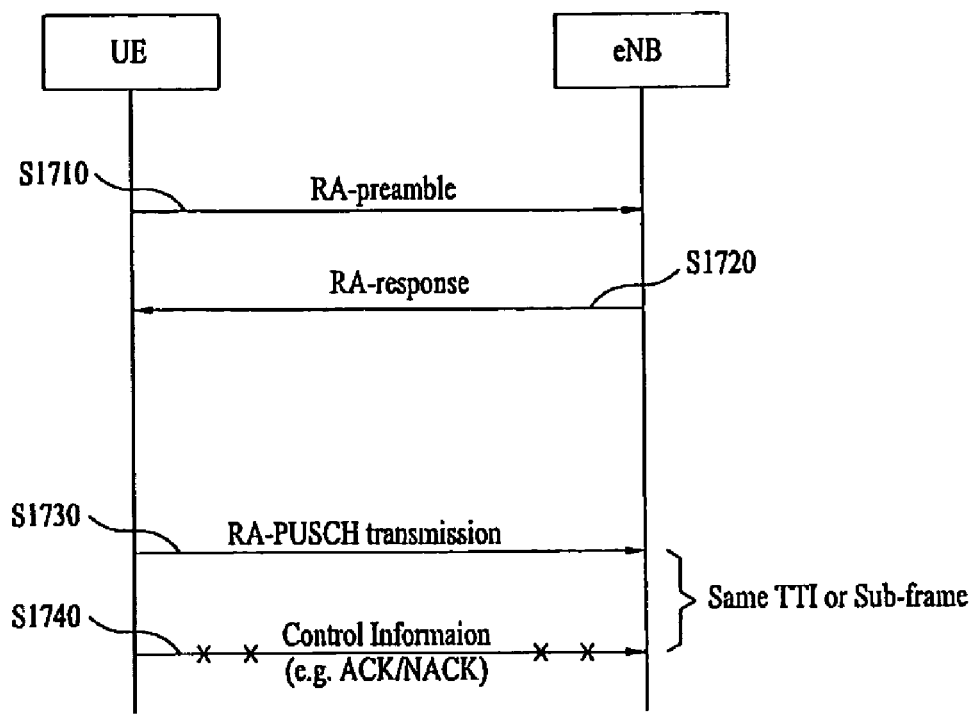
FIGS. 17-21 illustrate example operations of a UE when uplink transmission of a random access procedure collides with uplink transmission for control information according to another embodiment of the present invention.

As shown in FIG. 17, a UE transmits an RA-preamble to an eNB (S1710). When the eNB has successfully received the RA-preamble, the eNB transmits an RA-response including information of resource allocation for uplink transmission to the UE (S1720). Thereafter, the UE performs RA-PUSCH transmission using the information of random access for uplink transmission included in the RA-response (S1730). In this state, let us assume that the UE needs to transmit an uplink control information. When the UE needs to transmit both an RA-PUSCH and an uplink control information, the UE checks whether or not radio resources for transmitting the RA-PUSCH and the uplink control information collide. Here, the collision of radio resources indicates overlapping of at least a part of time and frequency resources for transmitting the RA-PUSCH and the uplink control information. Preferably, the collision of radio resources indicates overlapping of at least a part of time resources for signal transmission or at least a part of time/frequency resources. Here, whether or not time resources overlap can be determined on a TTI basis or a subframe basis. Accordingly, overlapping of at least a part of time resources may indicate that different signals are transmitted through the same TTI or the same subframe.

In the example of FIG. 17 wherein radio resources collide, it is assumed that an RA-PUSCH and an uplink control information are transmitted through the same TTI or subframe. However, this example is only illustrative for better understanding of the present invention, and examples of collision of radio resources include collision of at least a part of frequency resources simultaneously with collision of time resources. In the case where radio resources for transmitting the RA-PUSCH and the uplink control information collide, the UE transmits only the RA-PUSCH and does not transmit the uplink control information (S1740). As described above, in the case where radio resources for transmitting an RA-PUSCH and uplink control information collide (for example when an RA-PUSCH and uplink control information are transmitted through the same TTI or subframe), it is possible to increase data transmission efficiency associated with the random access procedure by sacrificing uplink transmission of the uplink control information.

Embodiment 5

Ignore Downlink Signal Requiring Transmission of Uplink Control Information During Random Access Procedure The UE may not decode or may ignore a downlink packet scheduling signal associated with transmission of an uplink control information and/or corresponding packets during all or part of the period until the UE transmits an RA-PUSCH after transmitting an RA-preamble. The UE may also not decode or may ignore a downlink packet scheduling signal associated with transmission of an uplink control information and/or packets corresponding to the downlink packet scheduling signal during all or part of the period until the UE terminates the random access attempt after transmitting the RA-preamble. However, the UE may decode downlink packets that do not require transmission of uplink control information. For example, the UE may decode a downlink scheduling signal of downlink packets (for example, broadcast or multicast packets) which do not require ACK/NACK transmission and packets corresponding to the downlink scheduling signal.

This method eliminates the need for the UE, which attempts random access, to simultaneously transmit the RA-PUSCH and the uplink control information. This method also eliminates decoding load of the UE which attempts random access. Details of this method are illustrated in FIGS. 18-21.

Figure 18:
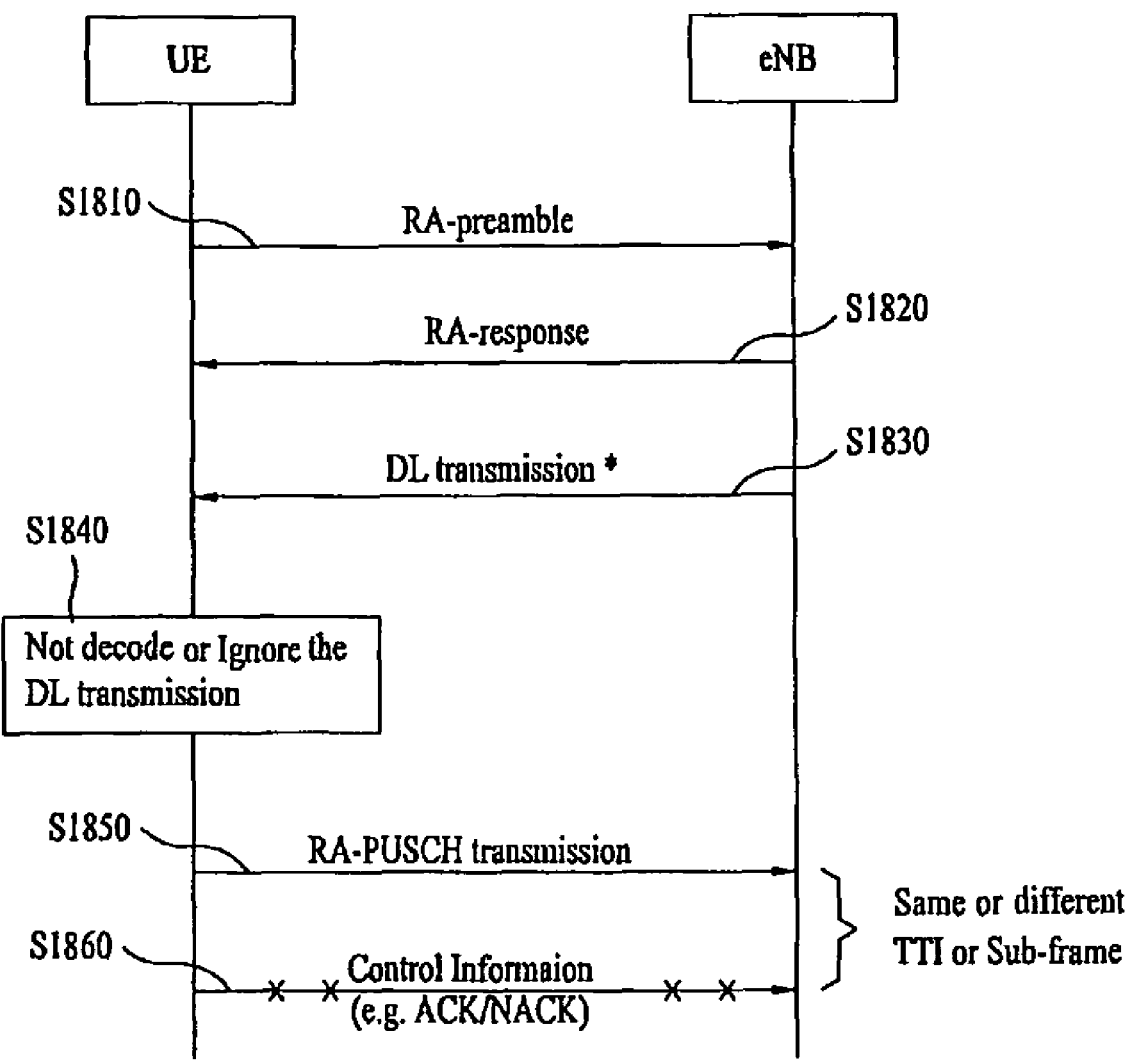

As shown in FIG. 18, a UE transmits an RA-preamble to an eNB (S1810). In the case where the eNB has successfully received the RA-preamble, the eNB transmits an RA-response including information of resource allocation for uplink transmission to the UE (S1820). Simultaneously with or after transmitting the RA-response, the eNB transmits downlink information associated with transmission of uplink control information to the UE (S1830). In this case, the UE does not decode or ignores the downlink information received after the RA-preamble is transmitted (S1840). That is, during the random access procedure, the UE may not decode the downlink information or alternatively may omit processes associated with the downlink information although the UE decodes the downlink information. Thereafter, the UE performs RA-PUSCH transmission using the information of resource allocation for uplink transmission included in the RA-response (S1850). Since the UE has not decoded or has ignored the downlink information at step S1840, the UE cannot perform PUSCH transmission of uplink control information (S1860). Here, the RA-PUSCH and the uplink control information may have been scheduled to be transmitted through the same or different TTIs or subframes.

In order to simplify system implementation, in the example of FIG. 18, the UE does not take into consideration whether or not the radio resources for transmitting the RA-PUSCH and the uplink control information actually collide. However, preferably, the UE may not decode or may ignore a downlink packet scheduling command associated with uplink control information transmitted using a TTI or subframe for transmission of the RA-PUSCH and/or packets corresponding to the downlink packet scheduling command.

Figure 19:
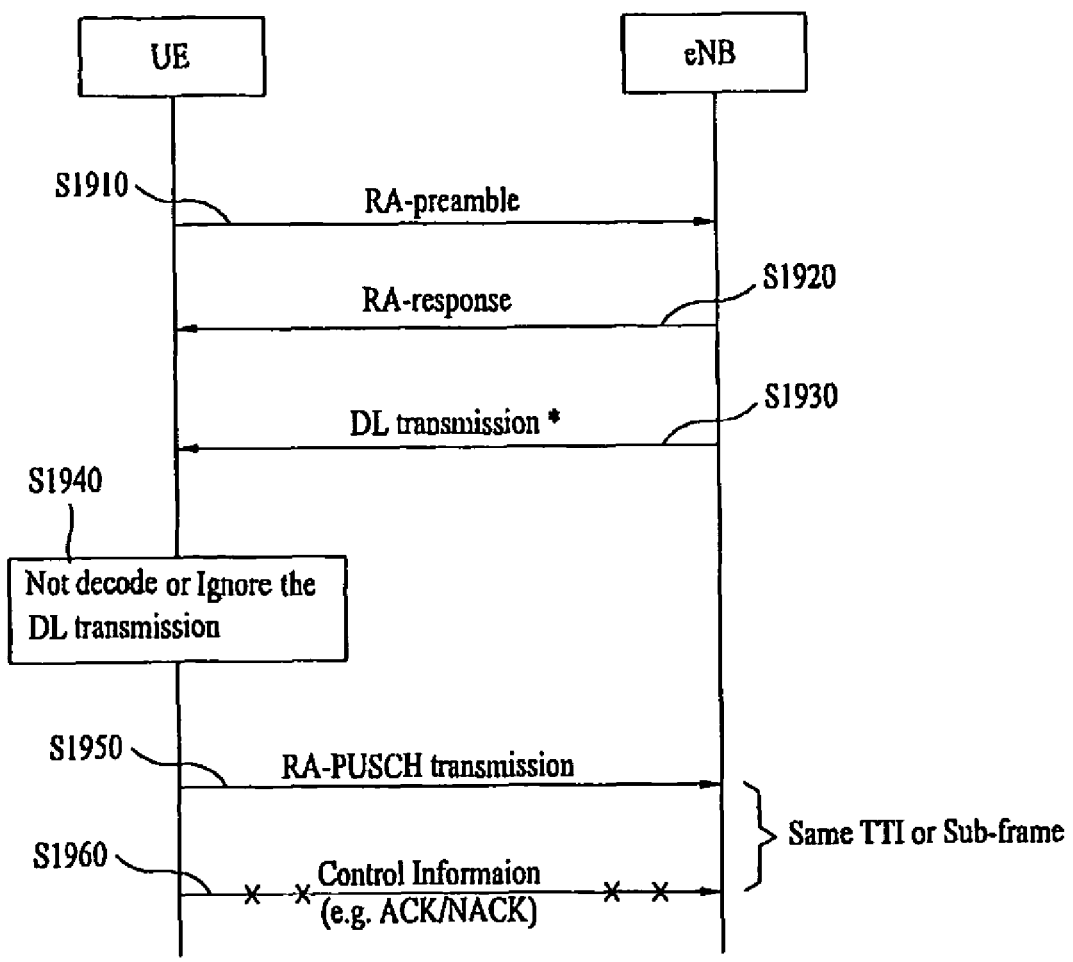

The basic procedure illustrated in FIG. 19 is identical to that of FIG. 18. Specifically, steps S1910-S1960 correspond to steps S1810-S1860, respectively. The procedure of FIG. 19 differs from that of FIG. 18 in that the radio resource for transmission of uplink control information collides with that of the RA-PUSCH. If the radio resources for transmission of the RA-PUSCH and the uplink control information collide, the UE may not decode or may ignore downlink information associated with transmission of the uplink control information (S1940). On the other hand, if the time resource for transmission of uplink control information does not collide with that of the RA-PUSCH, the UE may transmit the uplink control information through a PUSCH or PUCCH.

Figure 20:
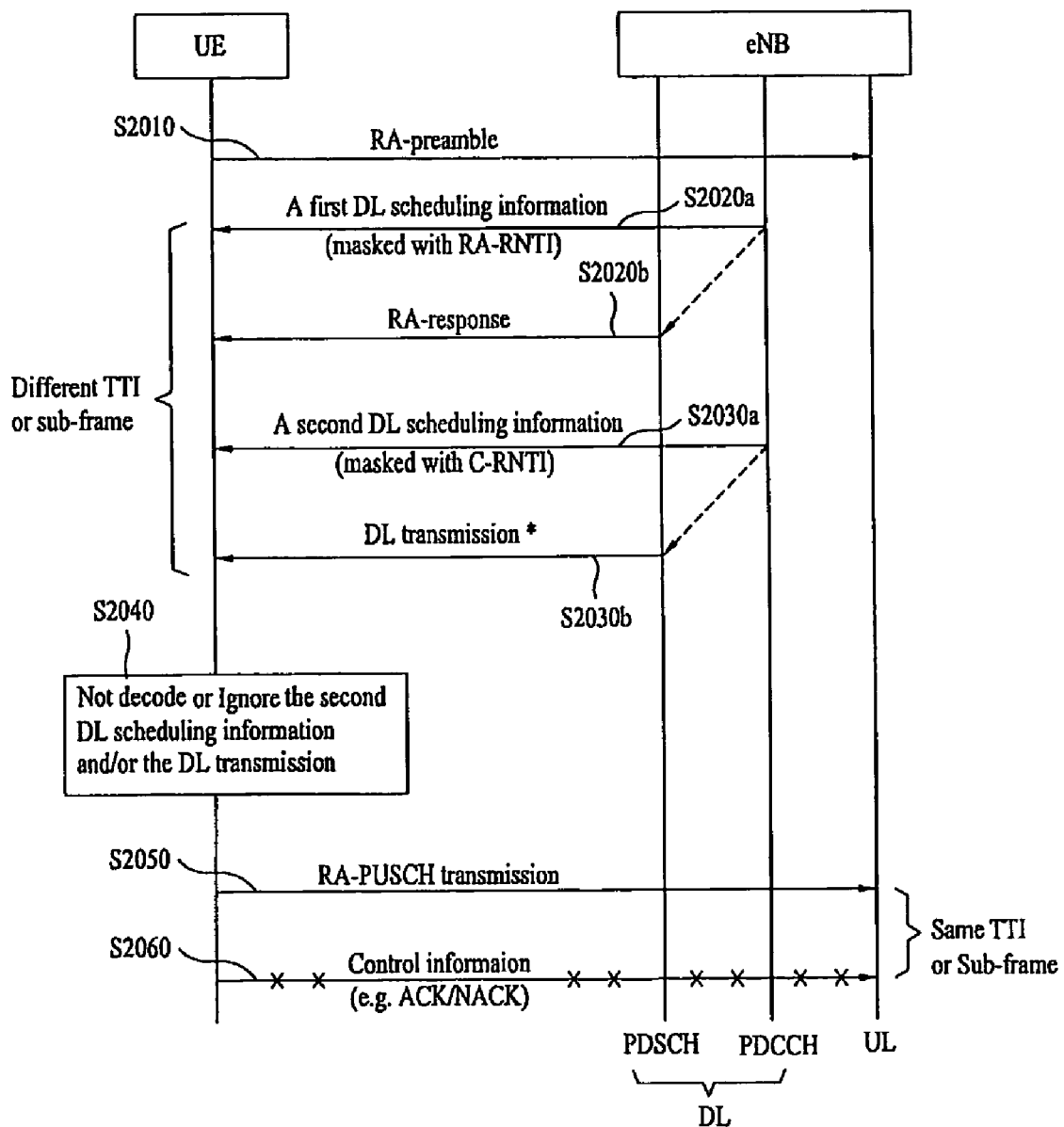
Figure 21:
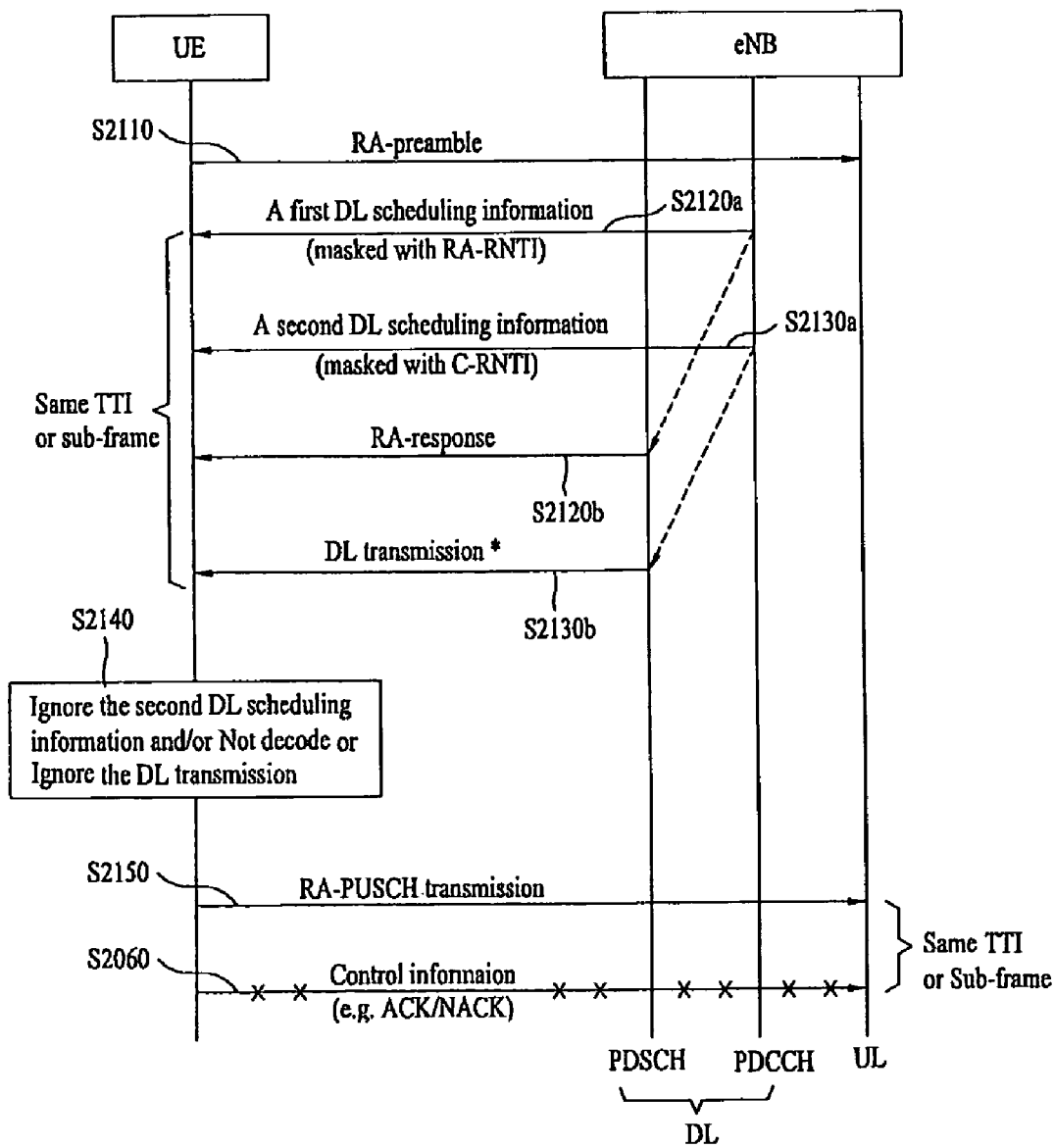

FIGS. 20 and 21 illustrate a more detailed version of the procedure of FIG. 19.

As shown in FIG. 20, a UE transmits an RA-preamble to an eNB (S2010). When the eNB has successfully received the RA-preamble, the eNB transmits first downlink scheduling information masked with an RA-RNTI through a PDCCH (S2020*a*). The first downlink scheduling information indicates a radio resource (PDSCH) through which an RA-response is transmitted. Thereafter, the eNB transmits the RA-response using the radio resource (PDSCH) indicated by the first downlink scheduling information (S2020*b*). Similarly, the eNB transmits second downlink scheduling information masked with a C-RNTI through a PDCCH (S2030*a*). The second downlink scheduling information indicates a radio resource (PDSCH) through which downlink information of the UE is transmitted. Thereafter, the eNB transmits the downlink information using the radio resource (PDSCH) indicated by the second downlink scheduling information (S2030*b*). The downlink information may be associated with subsequent transmission of uplink control information and the radio resource for transmission of the uplink control information may collide with that of the RA-PUSCH.

In this case, the "first downlink scheduling information and RA-response" and the "second downlink scheduling information and downlink information" are transmitted to the UE through different TTIs or subframes. Because the first downlink scheduling information associated with the RA-response has been received, the UE knows that a random access procedure is in progress and therefore the UE may not decode or may ignore second downlink scheduling information and/or downlink information that is received thereafter (S2040). Thereafter, the UE performs RA-PUSCH transmission using information of resource allocation for uplink transmission included in the RA-response (S2050). Since the UE has not decoded or has ignored the downlink information at step S2040, the UE cannot perform transmission of uplink control information associated with the downlink information (S2060).

A procedure illustrated in FIG. 21 is identical to that of FIG. 20, except that the "first downlink scheduling information and RA-response" and the "second downlink scheduling information and downlink scheduling information" are transmitted to the UE through the same TTI or subframe. Specifically, steps S2110-S2160 correspond to steps S2010-S2060, respectively. Here, it is to be noted that, since the first downlink scheduling information masked with an RA-RNTI and the second downlink scheduling information masked with a C-RNTI are transmitted through a PDCCH of the same TTI or subframe, the UE cannot determine the presence of first downlink scheduling information associated with the RA-response before the presence of second downlink scheduling information not associated with the RA-response. Accordingly, the UE cannot omit decoding of second downlink scheduling information even though the scheduling information is not associated with the RA-response and should monitor the PDCCH using both the RA-RNTI and the C-RNTI. If the UE receives and decodes both the first downlink scheduling information and the second downlink scheduling information, then the UE can detect the presence of the RA-response. In this case, the UE may ignore the second downlink scheduling information. That is, the UE may omit processes associated with the second downlink scheduling information. Accordingly, the UE may not decode a downlink transmission received through a radio resource (PDSCH) indicated by the second downlink scheduling information. The UE may also ignore the downlink transmission although it decodes the downlink transmission (S2140).

The above embodiments are provided by combining components and features of the present invention in specific forms. The components or features of the present invention should be considered optional if not explicitly stated otherwise. The components or features may be implemented without being combined with other components or features. The embodiments of the present invention may also be provided by combining some of the components and/or features. The order of the operations described above in the embodiments of the present invention may be changed. Some components or features of one embodiment may be included in another embodiment or may be replaced with corresponding components or features of another embodiment. It will be apparent that claims which are not explicitly dependent on each other can be combined to provide an embodiment or new claims can be added through amendment after this application is filed.

The embodiments of the present invention have been described focusing mainly on the data communication relationship between a terminal and a Base Station (BS). Specific operations which have been described as being performed by the BS may also be performed by an upper node as needed. That is, it will be apparent to those skilled in the art that the BS or any other network node may perform various operations for communication with terminals in a network including a number of network nodes including BSs. The term "base station (BS)" may be replaced with another term such as "fixed station", "Node B", "eNode B (eNB)", or "access point". The term "terminal" may also be replaced with another term such as "user equipment (UE)", "mobile station (MS)", or "mobile subscriber station (MSS)".

The embodiments of the present invention can be implemented by hardware, firmware, software, or any combination thereof. In the case where the present invention is implemented by hardware, an embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or the like.

In the case where the present invention is implemented by firmware or software, the embodiments of the present invention may be implemented in the form of modules, processes, functions, or the like which perform the features or operations described above. Software code can be stored in a memory unit so as to be executed by a processor. The memory unit may be located inside or outside the processor and can communicate data with the processor through a variety of known means.

As is apparent from the above description, the embodiments of the present invention have the following advantages.

First, it is possible to efficiently perform data transmission when different data transmission procedures are performed together in a wireless communication system.

Second, it is possible to efficiently perform data transmission when a separate uplink transmission procedure/downlink transmission procedure is performed together with uplink transmission of a random access procedure.

Third, it is possible to efficiently perform data transmission when uplink transmission associated with control information is performed together with uplink transmission of a random access procedure.

The present invention can be applied to a wireless communication system that supports at least one of SC-FDMA, MC-FDMA, and OFDMA. Particularly, the present invention can be applied to a method for resolving collision of signals transmitted in uplink in the wireless communication system.

Those skilled in the art will appreciate that the present invention may be embodied in other specific forms than those set forth herein without departing from the spirit and essential characteristics of the present invention. The above description is therefore to be construed in all aspects as illustrative and not restrictive. The scope of the invention should be determined by reasonable interpretation of the appended claims and all changes coming within the equivalency range of the invention are intended to be embraced in the scope of the invention.

What is claimed is:

1. A method for controlling a transmission of uplink control information at a user equipment in a wireless communication system, the method comprising:
    receiving by the user equipment a random access response including resource allocation information, wherein the resource allocation information indicates a radio resource used for a transmission of a shared channel as part of a random access procedure; and
    determining by the user equipment a channel assignment for the uplink control information if the transmission of the uplink control information is needed,
    wherein, if the transmission of the shared channel corresponding to the resource allocation information in the random access response is not present at a time when the transmission of the uplink control information is needed, then the transmission of the uplink control information is performed at the time, and
    wherein if the transmission of the shared channel corresponding to the resource allocation information in the random access response is present at a time when the transmission of the uplink control information is needed, then the transmission of the uplink control information is discarded at the time.

2. The method according to claim 1, wherein the time when the transmission of the uplink control information is needed indicates a Transmission Time Interval (TTI) or a subframe when the transmission of the uplink control information is needed.

3. The method according to claim 1, wherein the uplink control information includes at least one of an Acknowledgment (ACK)/Negative-Acknowledgement (NACK) signal used to perform Hybrid Automatic Repeat Request (HARQ), a Channel Quality Indicator (CQI) indicating a downlink channel status, and a scheduling request signal which serves to request allocation of uplink radio resources.

4. The method according to claim 1, wherein the shared channel includes a Physical Uplink Shared CHannel (PUSCH).

5. The method according to claim 1, further comprising:
performing the transmission of the shared channel in uplink while not transmitting the uplink control information.

6. A user equipment in a wireless communication system, the user equipment comprising:
a radio frequency (RF) module configured to transmit/receive radio signal to/from a base station;
a symbol generation module connected to the RF module and configured to generate Single Carrier-Frequency Division Multiple Access (SC-FDMA) symbol to be transmitted to the base station; and
a processor configured to control the RF module and the symbol generation module and to perform operations according to radio interface protocol,
wherein the processor is configured to receive a random access response including resource allocation information, the resource allocation information indicating a radio resource used for a transmission of a shared channel as part of a random access procedure,
wherein the processor is configured to determine a channel assignment for the transmission of the uplink control information when the transmission of the uplink control information is needed,
wherein, if the transmission of the shared channel corresponding to the resource allocation information in the random access response is not present at a time when the transmission of the uplink control information is needed, the processor is configured to perform the transmission of the uplink control information at the time, and
wherein, if the transmission of the shared channel corresponding to the resource allocation information in the random access response is present at a time when the transmission of the uplink control information is needed, the processor is configured to discard the transmission of the uplink control information at the time.

7. The user equipment according to claim 6, wherein the time when the transmission of the uplink control information is needed indicates a Transmission Time Interval (TTI) or a subframe when the transmission of the uplink control information is needed.

8. The user equipment according to claim 6, wherein the uplink control information includes at least one of an Acknowledgment (ACK)/Negative-Acknowledgement (NACK) signal used to perform Hybrid Automatic Repeat Request (HARQ), a Channel Quality Indicator (CQI) indicating a downlink channel status, and a scheduling request signal which serves to request allocation of uplink radio resources.

9. The user equipment according to claim 6, wherein the shared channel includes a Physical Uplink Shared CHannel (PUSCH).

10. The user equipment according to claim 6, wherein the processor is further configured to perform the transmission of the shared channel in uplink while not transmitting the uplink control information.

* * * * *